(12) United States Patent
Sawada et al.

(10) Patent No.: US 10,972,020 B2
(45) Date of Patent: Apr. 6, 2021

(54) CONTROL METHOD AND CONTROL DEVICE FOR ELECTRIC VEHICLE

(71) Applicant: Nissan Motor Co., Ltd., Kanagawa (JP)

(72) Inventors: Akira Sawada, Kanagawa (JP); Ken Itou, Kanagawa (JP); Kengo Fujiwara, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 16/618,002

(22) PCT Filed: Jun. 1, 2017

(86) PCT No.: PCT/JP2017/020521
§ 371 (c)(1),
(2) Date: Nov. 27, 2019

(87) PCT Pub. No.: WO2018/220805
PCT Pub. Date: Dec. 6, 2018

(65) Prior Publication Data
US 2020/0259431 A1 Aug. 13, 2020

(51) Int. Cl.
*H02P 7/293* (2016.01)
*H02P 5/52* (2016.01)
*H02P 21/18* (2016.01)
*B60L 50/50* (2019.01)

(52) U.S. Cl.
CPC .............. *H02P 5/52* (2013.01); *B60L 50/50* (2019.02); *H02P 21/18* (2016.02); *B60L 2240/421* (2013.01)

(58) Field of Classification Search
CPC ............. H02P 5/52; H02P 21/18; B60L 50/50
USPC ........................................................ 701/22
See application file for complete search history.

(56) References Cited

U.S. PATENT DOCUMENTS

| 8,694,189 B2* | 4/2014 | Motosugi ................ B60L 15/20 701/22 |
| 9,845,022 B2* | 12/2017 | Komatsu ............. B60L 15/2018 |
| 10,696,177 B2* | 6/2020 | Fujiwara .................. B60L 7/08 |
| 2002/0190683 A1 | 12/2002 | Karikomi et al. |
| 2012/0271456 A1 | 10/2012 | Zhang |

(Continued)

FOREIGN PATENT DOCUMENTS

| JP | 2003-9566 A | 1/2003 |
| JP | 2011-97794 A | 5/2011 |

(Continued)

*Primary Examiner* — Erick D Glass
(74) *Attorney, Agent, or Firm* — Osha Bergman Watanabe & Burton LLP

(57) ABSTRACT

The control method for an electric vehicle sets a motor torque command value based on vehicle information and controls torque of a first motor connected to a first drive wheel which is one of a front drive wheel and a rear drive wheel. The control method for an electric vehicle calculates a first torque command value by a feedforward computation based on the motor torque command value, detects a rotation angular velocity of the first motor, and estimates a rotation angular velocity of the first motor based on the first torque command value by using a vehicle model $Gp(s)$ that simulates a transfer characteristic from a torque input to the first drive wheel to a rotation angular velocity of the first motor.

13 Claims, 21 Drawing Sheets

(56) References Cited

U.S. PATENT DOCUMENTS

2015/0112532 A1     4/2015   Oono et al.
2018/0043792 A1     2/2018   Sawada et al.
2019/0381895 A1*   12/2019   Shindo .................. B60W 10/08

FOREIGN PATENT DOCUMENTS

| JP | 2017-85850 A | 5/2017 |
| WO | 2013/157315 A1 | 10/2013 |
| WO | 2016/120979 A1 | 8/2016 |

* cited by examiner ically, there is known a vibration damping con-
CONTROL METHOD AND CONTROL DEVICE FOR ELECTRIC VEHICLE This application is a national stage application of PCT Application No. PCT/JP2017/020521 filed on Jun. 1, 2017, the contents of which are hereby incorporated by reference in their entirety.

TECHNICAL FIELD

The present invention relates to a control method and a control device for an electric vehicle.

RELATED ART

Conventionally, there is known a vibration damping control device for an electric vehicle having a function of removing vibration due to torsion of a drive shaft by calculating a motor torque command value using a feedforward-feedback control system including a feedforward (F/F) compensator and a feedback (F/B) compensator (see JP 2003-9566A).

SUMMARY OF INVENTION

Herein, the feedback control system of the vibration damping control device disclosed in JP 2003-9566A estimates a motor rotation angular velocity of a control object using a vehicle model that models a transfer characteristic from a motor torque to a motor rotation angular velocity, and calculates a feedback torque based on a deviation between an estimated value and a detected value of the motor rotation angular velocity.

However, since the vehicle model described above is designed on the premise of a two-wheel drive vehicle, when a braking/driving force (braking/driving torque) is input from a different drive wheel, the motor rotation angular velocity estimated value calculated by the vehicle model and the actual motor rotation angular velocity diverge from each other. Therefore, there are cases where, in order to compensate for this divergence, a vibration suppression compensation value more than necessary is output from the F/B compensator, resulting in that acceleration or deceleration intended by a driver cannot be obtained.

One or more embodiments suppress the output of an excess vibration suppression compensation value from an F/B compensator by making a motor rotation angular velocity estimated value and an actual motor rotation angular velocity coincide with each other even when a braking/driving force is input from a different drive wheel.

The control method for an electric vehicle of one or more embodiments is a method for an electric vehicle that sets a motor torque command value based on vehicle information and controls torque of a first motor connected to a first drive wheel which is one of a front drive wheel and a rear drive wheel. The control method for an electric vehicle sets a motor torque command value based on vehicle information and controls torque of a first motor connected to a first drive wheel which is one of a front drive wheel and a rear drive wheel. The control method for an electric vehicle calculates a first torque command value by a feedforward computation based on the motor torque command value, detects a rotation angular velocity of the first motor, and estimates a rotation angular velocity of the first motor based on the first torque command value by using a vehicle model $Gp(s)$ that simulates a transfer characteristic from a torque input to the first drive wheel to a rotation angular velocity of the first motor. Then, the control device calculates a second torque command value from a deviation between a detected value and an estimated value of the rotation angular velocity of the first motor by using a filter $Hf(s)/Gp(s)$ composed of an inverse characteristic of the vehicle model $Gp(s)$ and a band-pass filter $Hf(s)$ with a center frequency close to a torsional vibration frequency of the vehicle, controls the torque of the first motor according to a front final torque command value obtained by adding the first torque command value and the second torque command value together, and corrects, when a braking/driving torque for a second drive wheel being the drive wheel other than the first drive wheel is input, the estimated value of the rotation angular velocity of the first motor based on the braking/driving torque. This correction calculates a motor rotation angular velocity correction amount by using a transfer function of the rotation angular velocity of the first motor for the second drive wheel, the transfer function modeled in advance, and corrects the estimated value of the rotation angular velocity of the first motor based on the motor rotation angular velocity correction amount.

The following describes the one or more embodiments in detail with accompanying drawings.

DETAILED DESCRIPTION

First, system configurations (system configuration 1, system configuration 2) of electric vehicles to which control devices for electric vehicle according to one or more embodiments are applied will be described.

System Configuration 1

Figure 1:
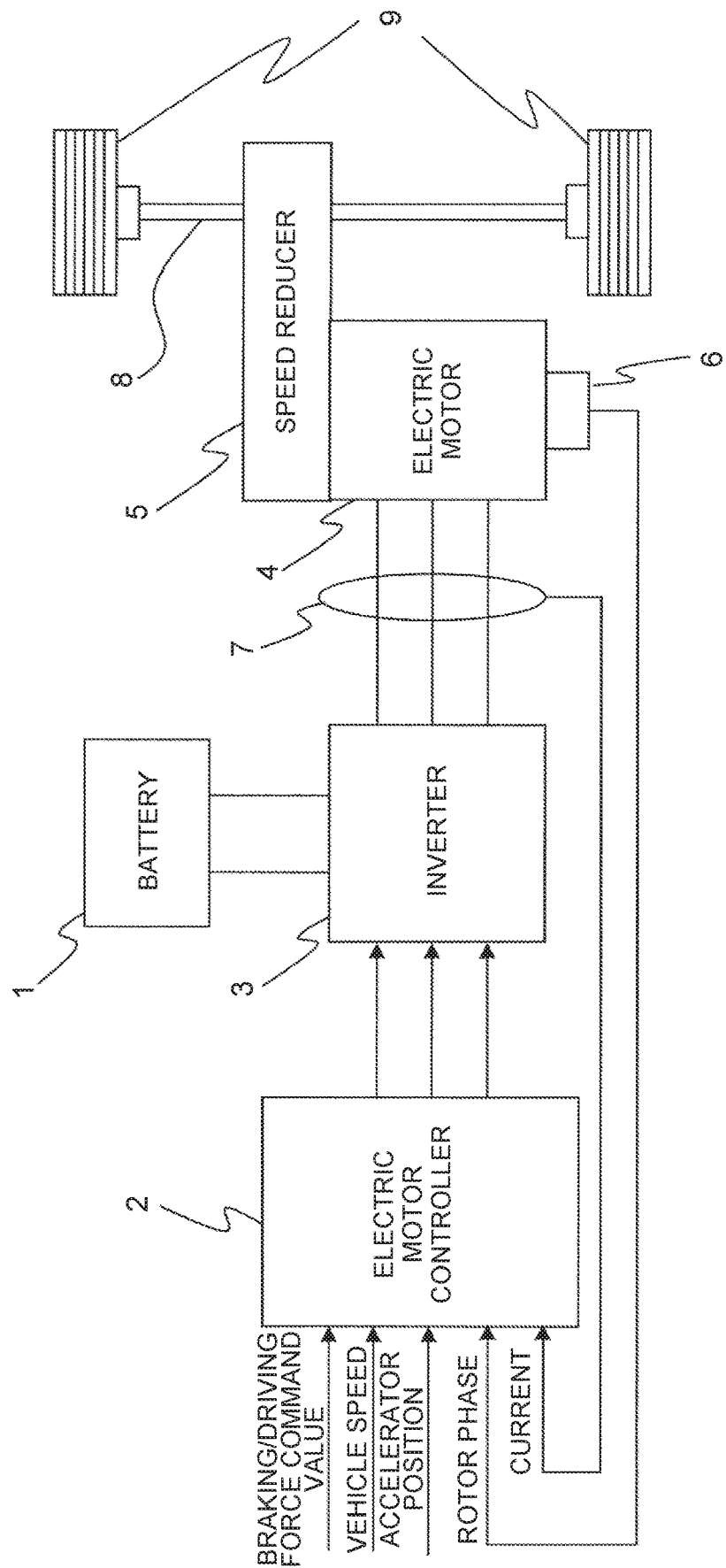
FIG. 1 is a block diagram illustrating a system configuration (system configuration 1) of an electric vehicle to which a control device of one or more embodiments is applied.

FIG. 1 is a block diagram illustrating a main system configuration (system configuration 1) of an electric vehicle to which a control device of one or more embodiments is applied. Note that the electric vehicle refers to an automobile including at least one electric motor (hereinafter also referred to simply as a motor) as a part or whole of a vehicle drive source and capable of traveling by a driving force of the electric motor and may be an electric car or a hybrid car.

A battery 1 discharges driving electric power to an electric motor 4 and is charged with regenerative electric power from the electric motor 4.

An electric motor controller 2 includes, for example, a central processing unit (CPU), a read only memory (ROM), a random access memory (RAM), and an input/output interface (I/O interface). Signals of various vehicle variables indicating vehicle states such as a vehicle speed V, an accelerator position θ, a rotor phase α of the electric motor 4, currents (iu, iv, iw in the case of three-phase alternating current) of the electric motor 4, and a braking/driving force command value are input to the electric motor controller 2 as digital signals. Based on the input signals, the electric motor controller 2 generates a PWM signal for controlling the electric motor 4. Further, the electric motor controller 2 generates a drive signal for an inverter 3 based on the generated PWM signal. Note that, as the braking/driving force command value, use may be made of a braking/driving force command value indicating a braking/driving force (braking/driving torque) that acts on the vehicle from other than the motor 4 of the system configuration 1, such as braking or engine output, or, for example, use may be made of a measured value detected by a sensor such as a brake pressure sensor, or the like.

The inverter 3 converts or inverts direct current supplied from the battery 1 into alternating current by turning on/off two switching elements (e.g. power semiconductor devices such as IGBTs or MOSFETs) provided for each phase, thereby causing desired current to flow through the electric motor 4.

The electric motor (three-phase AC motor) 4 generates a driving force by alternating current supplied from the inverter 3 and transmits the driving force to left and right drive wheels 9 through a speed reducer 5 and drive shafts 8. On the other hand, when rotated by rotation of the drive wheels 9a, 9b during the travel of the vehicle, the electric motor 4 generates a regenerative driving force to recover kinetic energy of the vehicle as electrical energy. In this case, the inverter 3 converts alternating current generated during the regenerative operation of the electric motor 4 into direct current and supplies the direct current to the battery 1.

A current sensor 7 detects three-phase alternating currents iu, iv, iw that flow through the electric motor 4. However, since the sum of the three-phase alternating currents iu, iv, iw is zero, the currents of the arbitrary two phases may be detected and then the current of the remaining phase may be obtained by calculation.

A rotation sensor 6 is, for example, a resolver or an encoder and detects a rotor phase α of the electric motor 4.

Figure 2:
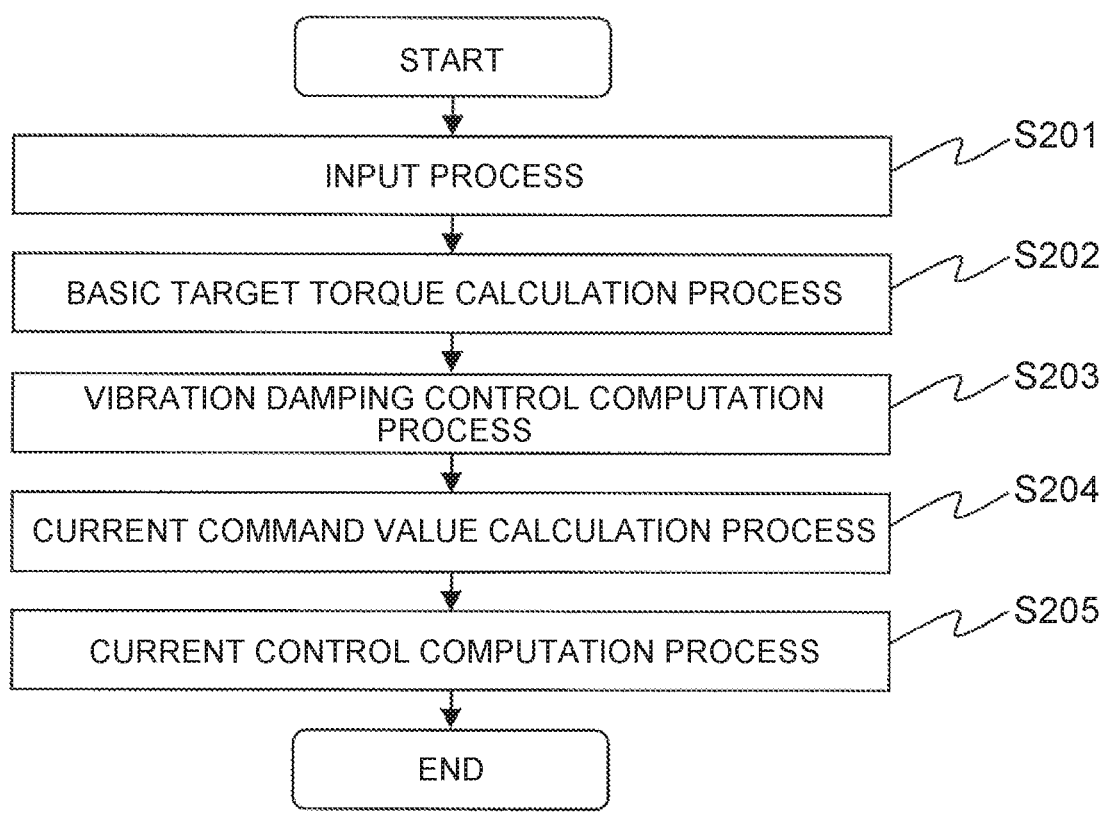
FIG. 2 is a flowchart illustrating the flow of processes performed by an electric motor controller.

FIG. 2 is a flowchart illustrating the flow of processes performed by the electric motor controller 2. The processes from step S201 to step S205 are programmed to be constantly performed at a fixed time interval while the vehicle system is operating.

At step S201, signals indicating vehicle states are input to the electric motor controller 2. Herein, a vehicle speed V (km/h), an accelerator position θ (%), a rotor phase α (rad) of the electric motor 4, a rotation speed Nm (rpm) of the electric motor 4, three-phase alternating currents iu, iv, iw that flow through the electric motor 4, a DC voltage value Vdc (V) of the battery 1, and a braking/driving force command value are input.

The vehicle speed V (km/h) is acquired from a non-illustrated vehicle speed sensor or from another non-illustrated controller by communication. Alternatively, the electric motor controller 2 obtains a vehicle speed v (m/s) by multiplying a rotor mechanical angular velocity ωm by a tire dynamic radius r and dividing the product by a gear ratio of a final gear, and then multiplies the vehicle speed v (m/s) by 3600/1000 to perform unit conversion, thereby obtaining a vehicle speed V (km/h).

The electric motor controller 2 acquires the accelerator position θ (%) from a non-illustrated accelerator position sensor. The accelerator position θ (%) may be acquired from another controller such as a non-illustrated vehicle controller.

The rotor phase α (rad) of the electric motor 4 is acquired from the rotation sensor 6. The rotation speed Nm (rpm) of the electric motor 4 is obtained by dividing a rotor angular velocity ω (electric angle) by the number of pairs of poles P of the electric motor to obtain a motor rotation speed ωm (rad/s) being a mechanical angular velocity of the electric motor 4, and then multiplying the obtained motor rotation speed ωm by 60/(2π). The rotor angular velocity ω is obtained by differentiating the rotor phase α.

The currents iu, iv, iw (A) that flow through the electric motor 4 are acquired from the current sensor 7.

The DC current value $V_{dc}$ (V) is detected by a voltage sensor (not illustrated) provided in a DC power line between the battery 1 and the inverter 3. Note that the DC voltage value $V_{dc}$ (V) may be detected by a signal transmitted from a battery controller (not illustrated).

The braking/driving force command value may be a braking torque calculated from a value of a hydraulic pressure sensor attached to a non-illustrated brake system, or may be acquired by communication from another controller (not illustrated) that inputs a braking/driving force to the vehicle, other than the motor 4 of the system configuration 1.

Figure 3:
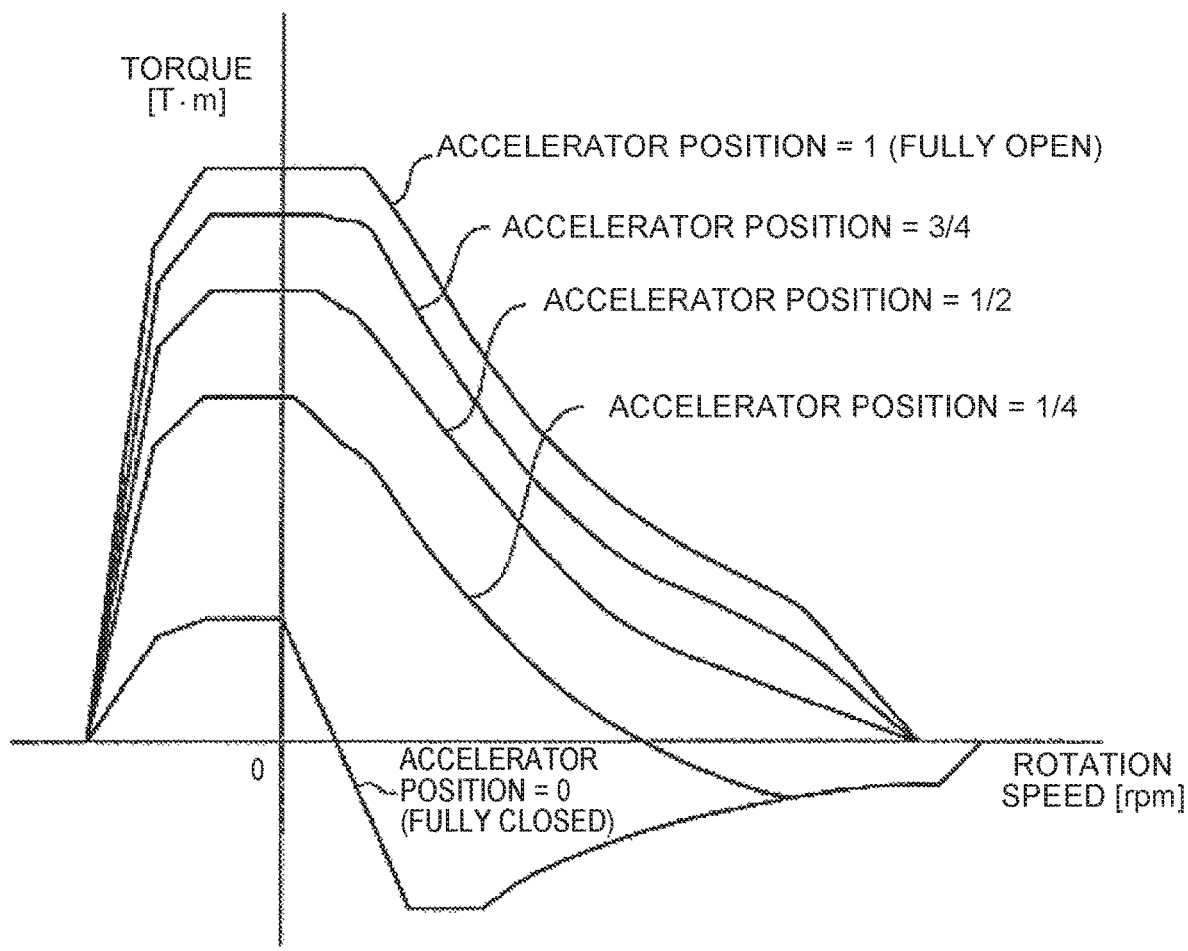
FIG. 3 is a diagram illustrating one example of an accelerator position (accelerator opening degree)—torque table.

At step S202, based on the vehicle information, the electric motor controller 2 sets a torque command value Tm* as a basic target torque required by a driver. Specifically, based on the accelerator position 0 and the vehicle speed V input at step S201, the electric motor controller 2 sets the torque command value Tm* by referring to an accelerator position—torque table illustrated in FIG. 3.

At step S203, the electric motor controller 2 performs a vibration damping control computation process. Specifically, based on the target torque command value Tm* set at step S202 and the motor rotation speed ωm, the electric motor controller 2 calculates a final torque command value Tmf* after vibration damping control that suppresses driving force transmission system vibration (torsional vibration of the drive shafts 8, etc.) without wasting drive shaft torque. Details of the vibration damping control computation process will be described later.

At step S204, the electric motor controller 2 performs a current command value calculation process. Specifically, the electric motor controller 2 obtains a d-axis current target value id* and a q-axis current target value iq* based on the final torque command value Tmf* calculated at step S203, the motor rotation speed ωm, and the DC voltage value $V_{dc}$. For example, a table defining the relationship between the torque command value, the motor rotation speed, and the DC voltage value, and the d-axis current target value and the q-axis current target value is prepared in advance, and by referring to this table, the d-axis current target value id* and the q-axis current target value iq* are obtained.

At step S205, current control for making a d-axis current id and a q-axis current iq respectively coincide with the d-axis current target value id* and the q-axis current target value iq* obtained at step S204 is performed. Accordingly, first, the d-axis current id and the q-axis current iq are obtained based on the three-phase alternating current values iu, iv, iw and the rotor phase a of the electric motor 4 that were input at step S201. Subsequently, d-axis and q-axis voltage command values vd, vq are calculated from deviations between the d-axis and q-axis current command values id*, iq* and the d-axis and q-axis currents id, iq. Herein, there are cases where decoupling control is applied to the calculated d-axis and q-axis voltage command values vd, vq.

Then, three-phase AC voltage command values vu, vv, vw are obtained from the d-axis and q-axis voltage command values vd, vq and the rotor phase a of the electric motor 4. Then, PWM signals tu (%), tv (%), tw (%) are obtained from the obtained three-phase AC voltage command values vu, vv, vw and the DC voltage value Vdc. By opening and closing the switching elements of the inverter 3 according to the PWM signals tu, tv, tw thus obtained, it is possible to drive the electric motor 4 by a desired torque indicated by the target torque command value Tm*.

System Configuration 2

Figure 4:
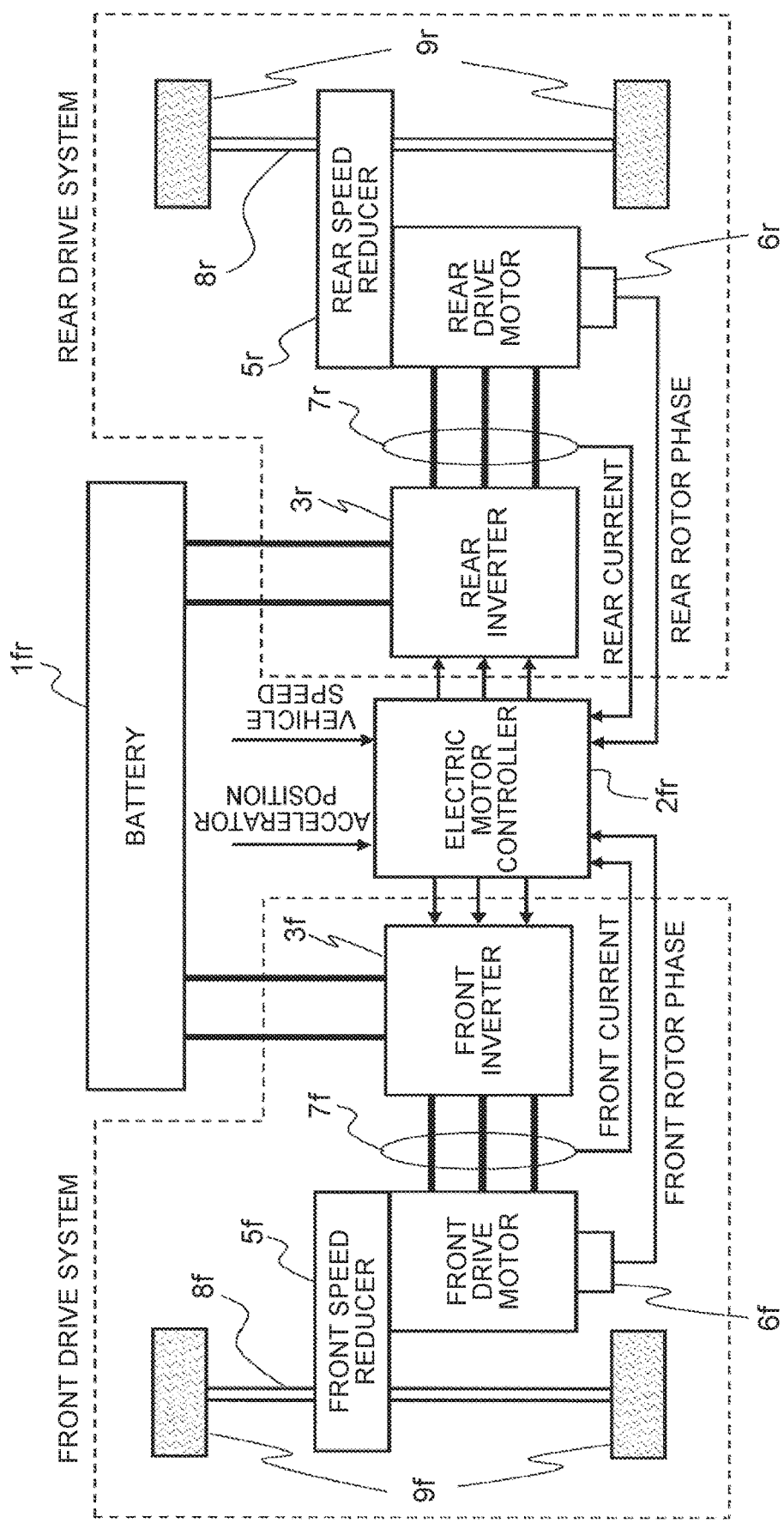
FIG. 4 is a block diagram illustrating a system configuration (system configuration 2) of an electric vehicle to which a control device of one or more embodiments is applied.

FIG. 4 is a block diagram illustrating a main system configuration (system configuration 2) of an electric vehicle to which a control device according to one or more embodiments is applied, wherein the electric vehicle differs from the electric vehicle including the system configuration 1 described above.

A battery 1fr discharges driving electric power to a front drive motor 4f and a rear drive motor 4r and is charged with regenerative electric power from the front drive motor 4f and the rear drive motor 4r.

Signals of various vehicle variables indicating vehicle states such as a vehicle speed V, an accelerator position θ, a rotor phase αf of the front drive motor 4f, a rotor phase αr of the rear drive motor 4r, currents (iu, iv, iw in the case of three-phase alternating current) of the front drive motor 4f, and currents (iu, iv, iw in the case of three-phase alternating current) of the rear drive motor 4r are input to an electric motor controller 2fr as digital signals. Based on the input signals, the electric motor controller 2fr generates PWM signals for respectively controlling the front drive motor 4f and the rear drive motor 4r. Further, the electric motor controller 2fr generates drive signals for a front inverter 3f and a rear inverter 3r based on the generated respective PWM signals.

The front inverter 3f and the rear inverter 3r (hereinafter also referred to collectively as the front/rear inverters 3f, 3r) each convert or invert direct current supplied from the battery 1fr into alternating current by turning on/off two switching elements (e.g. power semiconductor devices such as IGBTs or MOSFETs) provided for each phase, thereby causing desired currents to flow through the front drive motor 4f and the rear drive motor 4r.

The front drive motor 4f (three-phase AC motor) and the rear drive motor 4r (three-phase AC motor) (hereinafter also referred to collectively as the front/rear drive motors 4f, 4r) generate driving forces by alternating currents supplied from the front/rear inverters 3f, 3r and transmit the driving forces to front drive wheels 9f and rear drive wheels 9r (hereinafter also referred to collectively as the front/rear drive wheels 9f, 9r) through a front speed reducer 5fr and a rear speed reducer 5r, and front drive shafts 8f and rear drive shafts 8r. On the other hand, when rotated by rotation of the front/rear drive wheels 9f, 9r during the travel of the vehicle, the front/rear drive motors 4f, 4r generate regenerative driving forces to recover kinetic energy of the vehicle as electrical energy. In this case, the front/rear inverters 3f, 3r each convert alternating current generated during the regenerative operation into direct current and each supply the direct current to the battery 1fr.

Note that the front drive wheels 9f referred to in this specification represent the left and right drive wheels at the front of the vehicle, and the rear drive wheels 9r the left and right drive wheels at the rear of the vehicle.

A front rotation sensor 6f and a rear rotation sensor 6r are, for example, resolvers or encoders and respectively detect rotor phases αf, αr of the front/rear drive motors 4f, 4r.

Figure 5:
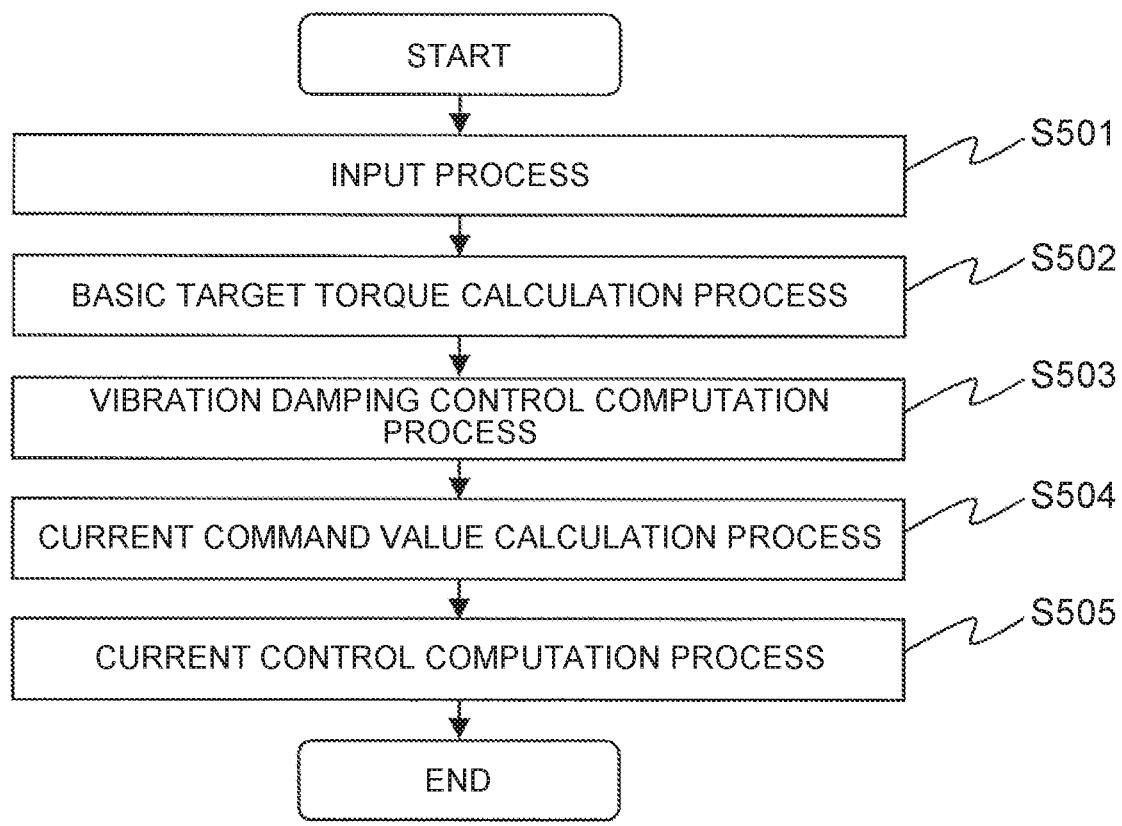
FIG. 5 is a flowchart illustrating the flow of processes performed by an electric motor controller.

FIG. 5 is a flowchart illustrating the flow of processes performed by the electric motor controller 2fr. The processes from step S501 to step S505 are programmed to be constantly performed at a fixed time interval while the vehicle system is operating.

At step S501, like in the system configuration 1 described above, signals of the front and rear configurations necessary for vibration damping control computation, which will be described below, are acquired from sensor inputs or from another controller by communication.

At step S502, based on the vehicle information, the electric motor controller 2fr sets a torque command value Tm* as a basic target torque required by a driver. Specifically, based on an accelerator position θ and a vehicle speed V input at step S501, the electric motor controller 2fr sets the torque command value Tm* by referring to the accelerator position—torque table illustrated in FIG. 3. Then, the electric motor controller 2fr performs a longitudinal driving force distribution process to calculate a front target torque command value Tm1* and a rear target torque command value Tmr1*.

Figure 6:
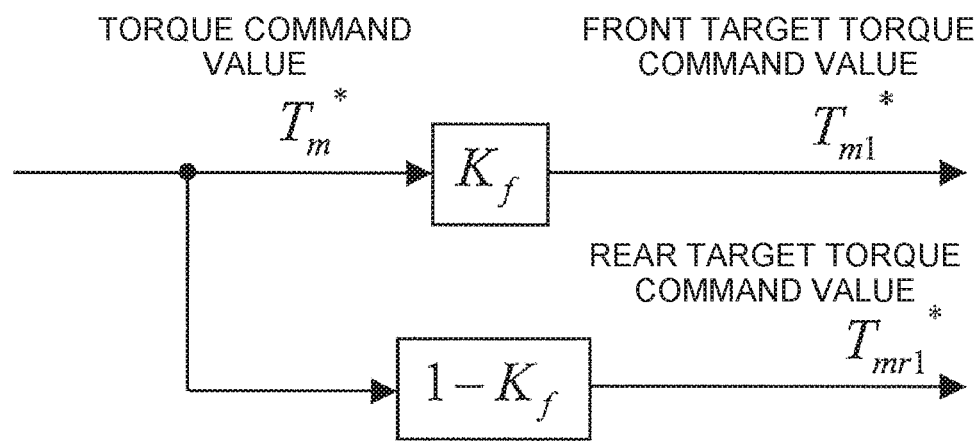
FIG. 6 is a diagram for explaining a longitudinal driving force distribution process.

FIG. 6 is a diagram for explaining the longitudinal driving force distribution process. In the figure, Kf is a value for distributing a driving force, which is output according to the torque command value Tm* as the driver's required torque, to the front drive motor 4f and the rear drive motor 4r and is set to a value from 0 to 1. The electric motor controller 2fr calculates the front target torque command value Tm1* for the front drive system by multiplying the torque command value Tm* by Kf set to the value from 0 to 1. Simultaneously, the electric motor controller 2fr calculates the rear target torque command value Tmr1 for the rear drive system by multiplying the torque command value Tm* by 1−Kf.

At step S503, the electric motor controller 2fr performs a vibration damping control computation process. At this step, using as an input the front target torque command value Tm1* calculated at step S502, the front drive system of the system configuration 2 calculates a front final torque command value Tmf* that suppresses driving force transmission system vibration (torsional vibration of the front drive shafts 8f, etc.).

Likewise, using as an input the rear target torque command value Tmr1 calculated at step S502, the rear drive system calculates a rear final torque command value Tmrf* that suppresses driving force transmission system vibration (torsional vibration of the rear drive shafts 8r, etc.). Details of the vibration damping control computation process, which is a feature of one or more embodiments, will be described later.

At step S504, like in the system configuration 1, the electric motor controller 2fr performs a current command value calculation process. Specifically, the electric motor controller 2fr obtains d-axis current target values id* and q-axis current target values iq* of the front/rear drive motors 4f, 4r based on the front and rear final torque command values Tmf*, Tmrf* calculated at step S503, front and rear motor rotation angular velocities ωmf, ωmr, and a DC voltage value $V_{dc}$.

At step S505, like in the system configuration 1, the electric motor controller 2fr performs current control. More specifically, the electric motor controller 2fr opens and closes the switching elements of the front/rear inverters 3f, 3r according to PWM signals for the front and rear drive systems obtained in the same manner as described in the system configuration 1 so that it is possible to drive the front/rear drive motors 4f, 4r by desired torques indicated by the front and rear final torque command values Tmf*, Tmrf*.

The above is the system configurations of the electric vehicles to which the control devices for electric vehicle according to one or more embodiments are applied, and the outline of the processes performed by the controllers (the electric motor controller 2 and the electric motor controller 2fr) included in the respective systems. Hereinafter, one or more embodiments will be described mainly with respect to details of the vibration damping control computation processes which are the features of one or more embodiments.

A control device for an electric vehicle of one or more embodiments are supposed to be applied to the system configuration 2 described above. Hereinafter, details of the vibration damping control process that is performed at step S503 described above by the control device for an electric vehicle of one or more embodiments will be described. Note that the vibration damping control process is performed for the purpose of removing (suppressing) vibration caused mainly by torsion of the drive shafts in the driving force transmission system of the vehicle.

First, the equation of motion from a front torque command value to a front motor rotation angular velocity of the vehicle including the drive motors respectively for the front and rear drive wheels (system configuration 2, see FIG. 4) will be described with reference to FIG. 7.

Figure 7:
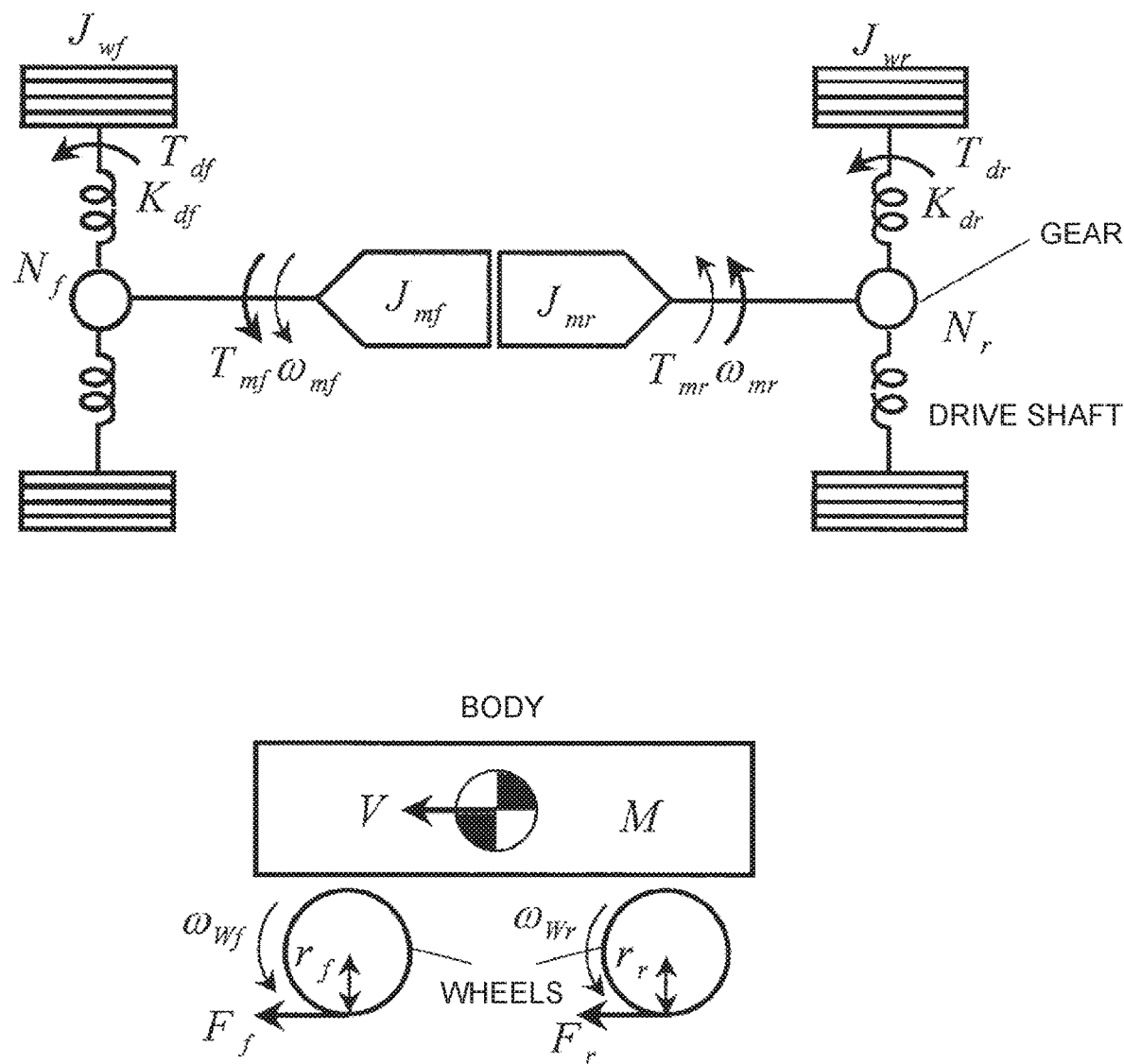
FIG. 7 is a diagram for explaining the equation of motion of a 4WD vehicle.

FIG. 7 is a diagram modeling the driving force transmission system of the vehicle according to the system configuration 2 (hereinafter also referred to as the 4WD vehicle), and respective parameters in the same figure are as follows. Note that auxiliary symbols f and r respectively represent front and rear.

$J_{mf}$, $J_{mr}$: motor inertia
$J_{wf}$, $J_{wr}$: drive wheel inertia (for one shaft)
$K_{df}$, $K_{dr}$: torsional rigidity of driving system
$K_{tf}$, $K_{tr}$: coefficient for friction between tire and road surface
$N_f$, $N_r$: overall gear ratio
$r_f$, $r_r$: tire loaded radius
$\omega_{mf}$, $\omega_{mr}$: motor rotation angular velocity
$\theta_{mf}$, $\theta_{mr}$: motor rotation angle
$\omega_{wf}$, $\omega_{wr}$: drive wheel rotation angular velocity
$\theta_{wf}$, $\theta_{wr}$: drive wheel rotation angle
$T_{mf}$, $T_{mr}$: motor torque
$T_{df}$, $T_{dr}$: drive shaft torque
$F_f$, $F_r$: driving force (for two shafts)
$\theta_{df}$, $\theta_{dr}$: drive shaft torsion angle
V: vehicle body speed
M: vehicle body weight From FIG. 7, the equation of motion of the 4WD vehicle is given by the following formulas (1) to (11).

[Formula 1]
$$J_{mf} \cdot \dot{\omega}_{mf} = T_{mf} - T_{df}/N_f \tag{1}$$

[Formula 2]
$$J_{mr} \cdot \dot{\omega}_{mr} = T_{mr} - T_{dr}/N_r \tag{2}$$

[Formula 3]
$$2J_{wf} \cdot \dot{\omega}_{wf} = T_{df} - r_f F_f \tag{3}$$

[Formula 4]
$$2J_{wr} \cdot \dot{\omega}_{wr} = T_{dr} - r_r F_r \tag{4}$$

[Formula 5]
$$M \cdot \dot{V} = F_f + F_r \tag{5}$$

[Formula 6]
$$T_{df} = K_{df} \cdot \theta_{df} \tag{6}$$

[Formula 7]
$$T_{dr} = K_{dr} \cdot \theta_{dr} \tag{7}$$

[Formula 8]
$$F_f = K_{tf} \cdot (r_f \omega_{mf} - V) \tag{8}$$

[Formula 9]
$$F_r K_{tr} \cdot (r_r \omega_{mr} - V) \tag{9}$$

[Formula 10]
$$\theta_{df} = \theta_{mf}/N_f - \theta_{wf} \tag{10}$$

[Formula 11]
$$\theta_{dr} = \theta_{mr}/N_r - \theta_{wr} \tag{11}$$

By the Laplace-transform of the above formulas (1) to (11), a transfer characteristic from a front motor torque Tmf to a front motor rotation angular velocity ωmf is obtained as given by the following formula (12).

[Formula 12]

$$\omega_{mf} = G_p(s) \cdot T_{mf} \quad (12)$$
$$G_p(s) = \frac{1}{s} \cdot \frac{b_6 s^6 + b_5 s^5 + b_4 s^4 + b_3 s^3 + b_2 s^2 + b_1 s + b_0}{a_6 s^6 + a_5 s^5 + a_4 s^4 + a_3 s^3 + a_2 s^2 + a_1 s + a_0}$$

where parameters in the formula (12) are respectively given by the following formulas (13) to (17).

[Formula 13]

$b_6 = \chi_{21}\delta_{21}$ $b_5 = \chi_{11}\delta_{11} + \chi_{21}\delta_{22} + \chi_{22}\delta_{21}$ $b_4 = \chi_{11}\delta_{12} + \chi_{21}\delta_{23} + \chi_{22}\delta_{22} + \chi_{23}\delta_{21}$ $b_3 = \chi_{11}\delta_{13} + \chi_{12}\delta_{11} + \chi_{22}\delta_{23} + \chi_{23}\delta_{22} + \chi_{24}\delta_{21}$ $b_2 = \chi_{12}\delta_{13} + \chi_{12}\delta_{12} + \chi_{23}\delta_{23} + \chi_{24}\delta_{22}$ $b_1 = \chi_{12}\delta_{13} + \chi_{24}\delta_{23}$ $b_0 = \chi_{12}\delta_{14}$ (13)

[Formula 14]

$a_6 = \chi_{21}\delta_{41}$ $a_5 = \chi_{11}\delta_{31} + \chi_{22}\delta_{41} + \chi_{21}\delta_{44}$ $a_4 = \chi_{11}\delta_{32} + \chi_{23}\delta_{41} + \chi_{22}\delta_{42} + \chi_{21}\delta_{43}$ $a_3 = \chi_{12}\delta_{31} + \chi_{11}\delta_{33} + \chi_{24}\delta_{41} + \chi_{23}\delta_{42} + \chi_{22}\delta_{43} + \chi_{21}\delta_{44}$ $a_2 = \chi_{12}\delta_{32} + \chi_{11}\delta_{34} + \chi_{24}\delta_{42} + \chi_{23}\delta_{43} + \chi_{22}\delta_{44}$ $a_1 = \chi_{12}\delta_{33} + \chi_{24}\delta_{43} + \chi_{23}\delta_{44}$ $a_0 = \chi_{12}\delta_{34} + \chi_{24}\delta_{44}$ (14)

[Formula 15]

$\chi_{11} = 2J_{wr}^2 r_r N_r^2 J_{mr}$ $\chi_{12} = (2J_{wr} + N_r^2 J_{mr})K_{dr} r_r K_{tr}^2$ $\chi_{21} = 2J_{wr} K_{tr} r_r N_r^2 J_{mr}$ $\chi_{22} = K_{tr}^2 r_r^3 N_r^2 J_{mr}$ $\chi_{23} = (2J_{wr} + N_r^2 J_{mr})K_{dr} K_{tr} r_r$ $\chi_{24} = K_{dr} K_{tr}^2 r_r^3$ (15)

[Formula 16]

$\delta_{11} = 2J_{wf} M$ $\delta_{12} = 2J_w K_{tf} + K_{tf} r_f^2 M$ $\delta_{13} = K_{df} M$ $\delta_{14} = K_{df} K_{tf}$ $\delta_{21} = 2J_{wf}$ $\delta_{22} = K_{tf} r_f^2 M$ $\delta_{23} = K_{df}$ (16)

[Formula 17]

$\delta_{31} = N_f^2 2J_{mf} J_{wf} M$ $\delta_{32} = N_f^2 2J_{wf} K_{tf} J_{mf} + N_f^2 r_f^2 M K_{tf} J_{mf}$ $\delta_{33} = N_f^2 J_{mf} K_{df} M$ $\delta_{34} = 2J_{wf} K_{df} K_{tf} + N_f^2 J_{mf} K_{df} K_{tf} + r_r^2 M K_{df} K_{tf}$ $\delta_{41} = N_f^2 2J_{mf} J_{wf}$ $\delta_{42} = N_f^2 r_f^2 K_{tf} J_{mf}$ $\delta_{43} = 2J_{wf} K_{df} + N_f^2 J_{mf} K_{df}$ $\delta_{44} = r_f K_{df} K_{tf}$ (17)

Poles and zero points of the transfer function given by the formula (12) are examined, and the following formula (18) is obtained.

[Formula 18]

$$G_p = \frac{1}{s} \cdot M_p \cdot \frac{(s+\alpha')(s+\beta')(s^2 + 2\zeta'_{pr}\omega'_{pr} + \omega'^2_{pr})(s^2 + 2\zeta_{zf} + \omega_{zf} + \omega^2_{zf})}{(s+\alpha)(s+\beta)(s^2 + 2\zeta_{pr}\omega_{pr} + \omega^2_{pr})(s^2 + 2\zeta_{pf} + \omega_{zf} + \omega^2_{zf})} \quad (18)$$

Since α and α', β and β', ζpr and ζr', and ωpr and ωpr' in the formula (18) take very close values, a (second-order)/(third-order) transfer characteristic Gp(s) as given by the following formula (19) can be obtained by pole-zero cancellation (approximation of α=α', β=β', ζpr=ζpr', ωpr=ωpr').

[Formula 19]

$$G_p = \frac{1}{s} \cdot M'_p \frac{(s^2 + 2\zeta_{zf}\omega_{zf} + \omega^2_{zf})}{(s^2 + 2\zeta_{pf}\omega_{pf} + \omega^2_{pf})} \quad (19)$$

As a result, with respect to the equation of motion of the 4WD vehicle, the transfer characteristic from the front motor torque to the front motor rotation angular velocity can be approximated to the vehicle model Gp(s) given by the second-order/third-order formula (hereinafter also referred to as the 4WD vehicle model Gp(s)).

Herein, with respect to the vehicle model Gp(s), when a model response that restrains torsional vibration due to the front drive shafts 8f is given by the following formula (20), a feedforward compensator (a front F/F compensator 801, see FIG. 8) that restrains torsional vibration of the front drive system is given by the following formula (21).

[Formula 20]

$$G_r = \frac{1}{s} \cdot M'_p \frac{(s^2 + 2\zeta_{zf}\omega_{zf} + \omega_{zf}^2)}{(s^2 + 2\omega_{pf} + \omega_{pf}^2)} \quad (20)$$

[Formula 21]

$$\frac{G_r}{G_p} = \frac{(s^2 + 2\zeta_{pf}\omega_{pf} + \omega_{pf}^2)}{(s^2 + 2\omega_{pf} + \omega_{pf}^2)} \quad (21)$$

Likewise, a transfer characteristic from a rear motor torque Tmr to a rear motor rotation angular velocity ωmr is obtained as given by the following formula (22).

[Formula 22]

$$\omega_{mr} = G_{pr}(s) \cdot T_{mr} \quad (22)$$
$$G_{pr} = \frac{1}{s} \cdot M'_{pr} \cdot \frac{(s^2 + 2\zeta_{zr}\omega_{zr} + \omega_{zr}^2)}{(s^2 + 2\zeta_{pr}\omega_{pr} + \omega_{pr})}$$

Herein, with respect to the vehicle model Gpr(s), when a model response that restrains torsional vibration due to the rear drive shafts 8r is given by the following formula (23), an F/F compensator (a rear F/F compensator 805, see FIG. 8) that restrains torsional vibration of the rear drive system is given by the following formula (24).

[Formula 23]

$$G_{rr} = \frac{1}{s}M'_{pr}\frac{(s^2 + 2\zeta_{zr}\omega_{zr} + \omega_{zr}^2)}{(s^2 + 2\omega_{pr} + \omega_{pr}^2)} \quad (23)$$

[Formula 24]

$$\frac{G_{rr}}{G_{pr}} = \frac{(s^2 + 2\zeta_{pr}\omega_{pr} + \omega_{pr}^2)}{(s^2 + 2\omega_{pr} + \omega_{pr}^2)} \quad (24)$$

Subsequently, the equation of motion of the 4WD vehicle from a rear final torque command value Tmf to a front motor rotation angular velocity ωmf will be described specifically with reference to FIG. 7.

By the Laplace-transform of the above formulas (1) to (11), a transfer characteristic from a rear motor torque command value as a braking/driving torque for the rear drive wheels to a front motor rotation angular velocity is obtained as given by the following formula (25). Note that parameters in the formula (22) are respectively given by the above formulas (13) to (17).

[Formula 25]

$$\omega_{mf} = G_{prf}(s) \cdot T_{mr} \quad (25)$$
$$G_{prf}(s) = \frac{1}{s} \cdot \frac{b'_0}{a_6 s^6 + a_5 s^5 + a_4 s^4 + a_3 s^3 + a_2 s^2 + a_1 s + a_0}$$

Poles of the transfer function given by the formula (25) are examined and given by the following formula (26).

[Formula 26]

$$G_{prf} = \frac{1}{s} \cdot \frac{M_{prf}}{(s+\alpha)(s+\beta)(s^2 + 2\zeta_{pr}\omega_{pr} + \omega_{pr}^2)(s^2 + 2\zeta_{pf}\omega_{pf} + \omega_{pf}^2)} \quad (26)$$

where since α and β of the poles of the formula (26) are located far from the origin and dominant poles, the influence on the vehicle model given by Gprf(s) is small. Therefore, the formula (26) can be approximated to a transfer function given by the following formula (27).

[Formula 27]

$$G_{prf} = \frac{1}{s} \cdot \frac{M'_{prf}}{(s^2 + 2\zeta_{pr}\omega_{pr} + \omega_{pr}^2)(s^2 + 2\zeta_{pf}\omega_{pf} + \omega_{pf}^2)} \quad (27)$$

Further, when a rear vibration damping control algorithm is considered for the vehicle model Gprf(s), a transfer function is obtained as given by the following formula (28).

[Formula 28]

$$G_{prf} = \frac{1}{s} \cdot \frac{M'_{prf}}{(s^2 + 2\omega_{pr} + \omega_{pr}^2)(s^2 + 2\zeta_{pf}\omega_{pf} + \omega_{pf}^2)} \quad (28)$$

Then, in order to restrain torsional vibration of the front drive system from a model response of a motor rotation angular velocity estimated value of the front drive system, a transfer function of the following formula (29) is derived from the transfer function of the formula (28).

[Formula 29]

$$G_{rrf} = \frac{1}{s} \cdot \frac{M'_{prf}}{(s^2 + 2\omega_{pr} + \omega_{pr}^2)(s^2 + 2\omega_{pf} + \omega_{pf}^2)} \quad (29)$$

Likewise, a transfer characteristic from a front final torque command value Tmf to a rear motor rotation angular velocity ωmr is given by a formula (30).

[Formula 30]

$$\omega_{mr} = G_{pfr}(s) \cdot T_{mf} \quad (30)$$
$$G_{pfr} = \frac{1}{s} \cdot \frac{M_{pfr}}{(s+\alpha)(s+\beta)(s^2 + 2\zeta_{pr}\omega_{pr} + \omega_{pr}^2)(s^2 + 2\zeta_{pf}\omega_{pf} + \omega_{pf}^2)}$$

where since α and β of the poles of the formula (30) are located far from the origin and dominant poles, the influence on the vehicle model given by Gpfr(s) is small. Therefore, the formula (30) can be approximated to a transfer function given by the following formula (31).

[Formula 31]

$$G_{prf} = \frac{1}{s} \cdot \frac{M'_{pfr}}{(s^2 + 2\zeta_{pr}\omega_{pr} + \omega_{pr}^2)(s^2 + 2\zeta_{pf}\omega_{pf} + \omega_{pf}^2)} \quad (31)$$

Further, when a front vibration damping control algorithm is considered for the vehicle model Gpfr(s), a transfer function is obtained as given by the following formula (32).

[Formula 32]

$$G_{prf} = \frac{1}{s} \cdot \frac{M'_{pfr}}{(s^2 + 2\zeta_{pr}\omega_{pr} + \omega_{pr}^2)(s^2 + 2\omega_{pf} + \omega_{pf}^2)} \quad (32)$$

Then, in order to restrain torsional vibration of the rear drive system from a model response of a motor rotation angular velocity estimated value of the rear drive system, a transfer function of the following formula (33) is derived from the transfer function of the formula (32).

[Formula 33]

$$G_{rfr} = \frac{1}{s} \cdot \frac{M'_{pfr}}{(s^2 + 2\omega_{pr} + \omega_{pr}^2)(s^2 + 2\omega_{pf} + \omega_{pf}^2)} \quad (33)$$

The vibration damping control computation process that is performed using the vehicle models (transfer functions) described above will be described with reference to FIG. 8.

Figure 8:
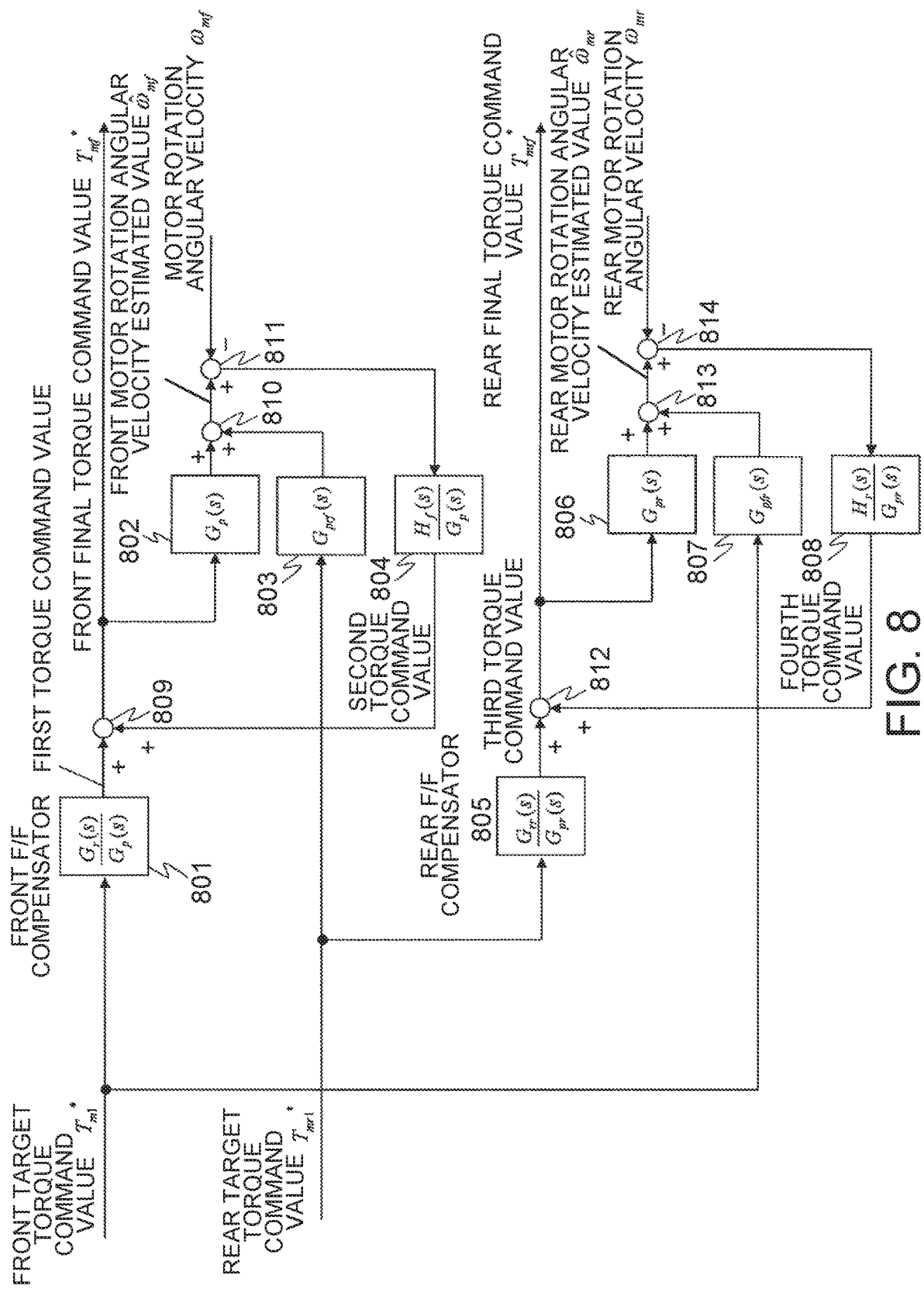
FIG. 8 is a block configuration diagram that realizes a vibration damping control computation process of one or more embodiments.

FIG. 8 is one example of a block configuration diagram that realizes the vibration damping control computation process of one or more embodiments. In control blocks illustrated in FIG. 8, a front final torque command value Tmf* is calculated from a front target torque command value Tm1*, a front motor rotation angular velocity ωmf, and a rear target torque command value Tmr1*. Further, a rear final torque command value Tmrf* is calculated from a rear target torque command value Tmr1*, a rear motor rotation angular velocity ωmr, and a front target torque command value Tm1*. Hereinafter, details of the respective control blocks illustrated in FIG. 8 will be described.

The front F/F compensator 801 is composed of the filter Gr(s)/Gp(s) given by the above formula (21). The front F/F compensator 801 calculates a first torque command value by using the front target torque command value Tm1* as an input and performing an F/F compensation process by the above formula (21).

An adder 809 adds the first torque command value and a later-described second torque command value to calculate the front final torque command value Tmf*.

A control block 802 is composed of the vehicle model Gp(s) given by the above formula (12). The control block 802 calculates a front motor rotation angular velocity estimated value by using the front final torque command value Tmf* as an input and using the vehicle model Gp(s).

A control block 803 is composed of the vehicle model Gprf(s) given by the above formula (25). The control block 803 calculates a correction front motor rotation angular velocity estimated value as a motor rotation angular velocity correction amount by using, as an input, the rear target torque command value Tmr1* as a braking/driving torque for the rear drive wheels and using the vehicle model Gprf(s). Note that, as the vehicle model Gprf(s), any one of the formulas (26) to (28) each being the approximate formula of the above formula (25) may be used for reducing the software computation load of the electric motor controller 2fr.

An adder 810 adds the correction front motor rotation angular velocity estimated value as the output of the control block 803 to the front motor rotation angular velocity estimated value as the output of the control block 802 to calculate a corrected front motor rotation angular velocity estimated value that is corrected in consideration of the braking/driving force for the rear drive wheels. Consequently, it is possible to make an estimated value and a detected value of the front motor rotation angular velocity coincide with each other.

A subtractor 811 subtracts the motor rotation angular velocity ωmf (detected value) from the corrected front motor rotation angular velocity estimated value to calculate a deviation between the estimated value and the detected value of the motor rotation angular velocity and outputs the calculated value to a control block 804.

The control block 804 is composed of a band-pass filter Hf(s) and an inverse characteristic of the vehicle model Gp(s) given by the above formula (19). The control block 804 calculates the second torque command value by using as an input the deviation between the estimated value and the detected value of the motor rotation angular velocity and multiplying the deviation by Hf(s)/Gp(s). Details of the band-pass filter Hf(s) will be described later.

Then, the first torque command value and the second torque command value are added together by the adder 809 so that the front final torque command value Tmf* is calculated.

Next, calculation of the rear final torque command value Tmrf will be described. The rear F/F compensator 805 is composed of the filter given by the above formula (24). The rear F/F compensator 805 calculates a third torque command value by using the rear target torque command value Tmr1* as an input and performing an F/F compensation process by the above formula (24).

An adder 812 adds the third torque command value and a later-described fourth torque command value to calculate the rear final torque command value Tmrf*.

A control block 806 is composed of the vehicle model Gpr(s) given by the above formula (22). The control block 806 calculates a rear motor rotation angular velocity estimated value by using the rear final torque command value Tmrf* as an input and using the vehicle model Gpr(s).

A control block 807 is composed of the vehicle model Gpfr(s) given by the above formula (30). The control block 807 calculates a correction rear motor rotation angular velocity estimated value by using the front target torque command value Tm1* as an input and using the vehicle model Gpfr(s). Note that, as the vehicle model Gpfr(s), any one of the formulas (31) to (33) each being the approximate formula of the above formula (30) may be used for reducing the software computation load of the electric motor controller 2fr.

An adder 813 adds the correction rear motor rotation angular velocity estimated value as the output of the control block 807 to the rear motor rotation angular velocity estimated value as the output of the control block 806 to calculate a corrected rear motor rotation angular velocity estimated value that is corrected in consideration of the braking/driving force for the front drive wheels. Consequently, it is possible to make an estimated value and a detected value of the rear motor rotation angular velocity coincide with each other.

A subtractor 814 subtracts the rear motor rotation angular velocity ωmr (detected value) from the corrected rear motor rotation angular velocity estimated value to calculate a deviation between the estimated value and the detected value of the rear motor rotation angular velocity and outputs the calculated value to a control block 808.

The control block 808 is composed of a band-pass filter Hr(s) and an inverse characteristic of the vehicle model Gpr(s) given by the above formula (22). The control block 808 calculates the fourth torque command value by using as an input the deviation between the estimated value and the detected value of the motor rotation angular velocity and multiplying the deviation by Hr(s)/Gpr(s). Details of the band-pass filter Hr(s) will be described later.

Then, the first torque command value and the second torque command value are added together by the adder 812 so that the rear final torque command value Tmrf* is calculated.

Herein, the front and rear band-pass filters Hf(s), Hr(s) will be described. Damping characteristics of each of the band-pass filters Hf(s), Hr(s) are approximately the same on the low-pass side and the high-pass side, and the torsional resonance frequency $f_p$ of each of the driving systems is set near the middle of the pass band on the logarithmic axis (log scale).

For example, when the band-pass filters Hf(s), Hr(s) are each composed of a first-order high-pass filter and a first-order low-pass filter, the band-pass filter Hf(s) is obtained as given by the following formula (34), and the band-pass filter Hr is obtained as given by the following formula (35).

[Formula 34]

$$H_f(s) = \frac{\tau_{Hf}s}{(1 + \tau_{Hf}s) \cdot (1 + \tau_{Lf}s)} \quad (34)$$

where $\tau_{Lf}=1/(2\pi f_{HCf})$, $f_{HCf}=kf \cdot f_{pf}$, $\tau_{Hf}=1/(2\pi f_{LCf})$, and $f_{LCf}=f_{pf}/kf$. The frequency $f_{pf}$ is a torsional resonance frequency of the driving system of the front drive system, and kf is an arbitrary value forming the band pass.

[Formula 35]

$$H_r(s) = \frac{\tau_{Hr}s}{(1 + \tau_{Hr}s) \cdot (1 + \tau_{Lr}s)} \quad (35)$$

where $\tau_{Lr}=1/(2\pi f_{HCr})$, $f_{HCr}=kr \cdot f_{pr}$, $\tau_{Hr}=1/(2f_{LCr})$, and $f_{LCr}=f_{pr}/kr$. The frequency $f_{pr}$ is a torsional resonance frequency of the driving system of the rear drive system, and kr is an arbitrary value forming the band pass.

Herein, the vibration damping control computation results by the control device for an electric vehicle of one or more embodiments will be described with reference to FIG. 9.

Figure 9:
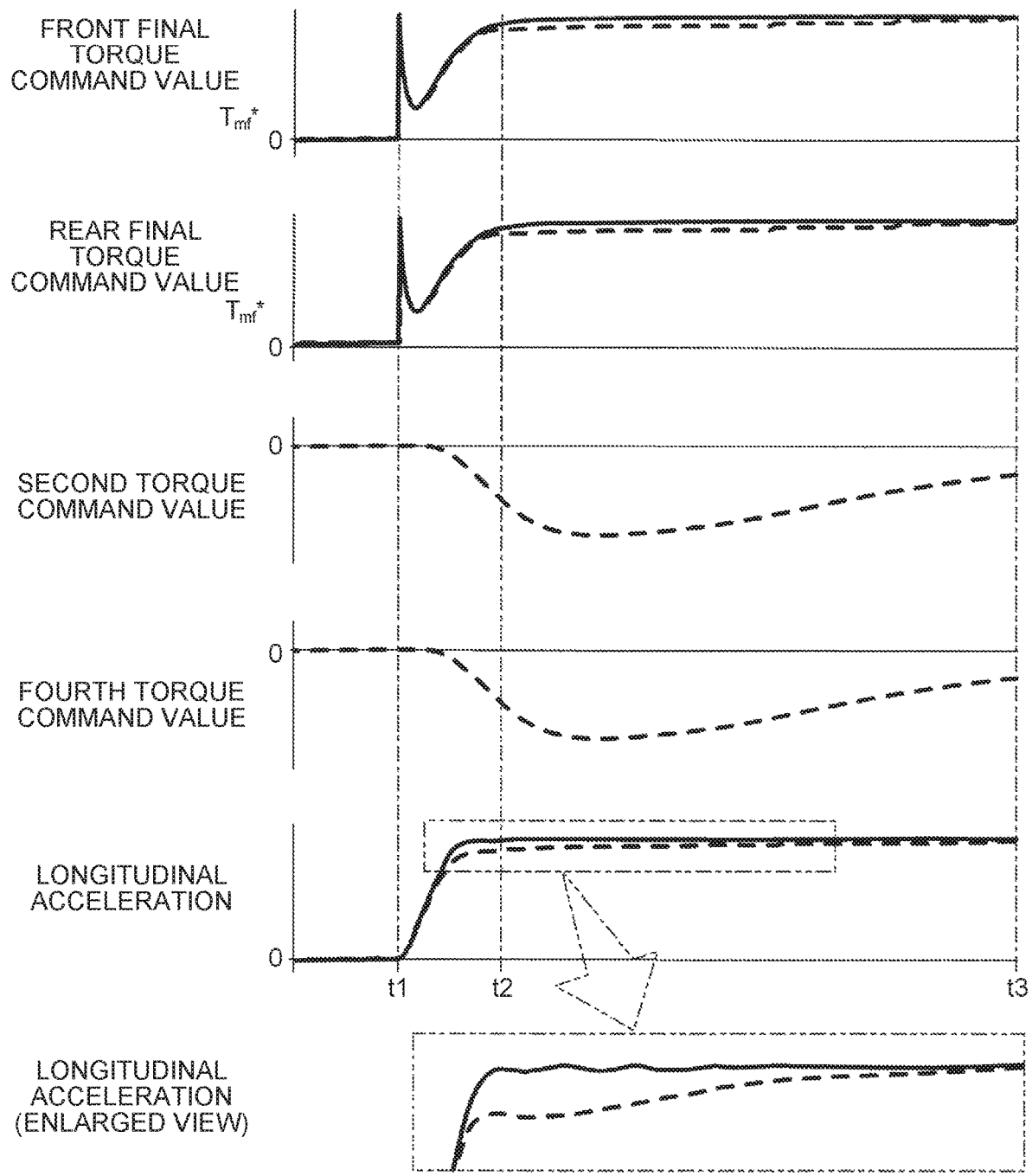
FIG. 9 is a time chart illustrating one example of the control results when control devices of one or more embodiments are applied to electric vehicles, and the control results according to the prior art.

FIG. 9 is a time chart for comparison between the control results by control devices for electric vehicle of one or more embodiments and the control results according to the prior art. In the figure, a front final torque command value Tmf*, a rear final torque command value Tmrf*, a second torque command value as a front vibration damping F/B torque, a fourth torque command value as a rear vibration damping F/B torque, a longitudinal acceleration of a vehicle, and an enlarged view of the longitudinal acceleration are respectively illustrated in this order from above. In the figure, solid lines indicate the control results according to one or more embodiments, and broken lines indicate the control results according to the prior art.

FIG. 9 illustrates a control state of a vehicle, being a 4WD electric vehicle including electric motors as power sources not only for front drive wheels but also for rear drive wheels, when a driver rapidly depresses an accelerator from a stopped state of the vehicle so that the front target torque command value and the rear target torque command value are increased by a step to accelerate the vehicle.

First, at time t1, the front target torque command value and the rear target torque command value are changed by a step by depression of the accelerator pedal by the driver.

Then, in the prior art (broken lines), since only one of front and rear braking/driving forces is considered, actual detected values become greater than front and rear motor rotation speed estimated values calculated by a feedback control system corresponding to an addition of a driving force by the other drive wheels. Then, in order to compensate for a torque corresponding to a motor rotation speed detected greater than estimated, the torque command value is corrected to the negative torque side (in a direction to reduce the motor torque) to impede the acceleration from time t1 to t3 (see the second and fourth torque command values). Therefore, the front final torque command value Tmf* and the rear final torque command value Tmrf* cannot be output as torque command values required by the driver. As a result, it is seen that the longitudinal acceleration (acceleration) of the vehicle is limited around time t2 compared to that at time t3 (see particularly LONGITUDINAL ACCELERATION (ENLARGED VIEW)).

In this way, in the prior art, since excess vibration suppression compensation is output from a vibration damping control F/B compensator to impede the acceleration of the vehicle, it is not possible to obtain an acceleration or deceleration intended by the driver based on an accelerator operation or a brake operation by the driver, and therefore, a sense of incongruity is given to the driver.

By contrast, according to the control device for an electric vehicle of one or more embodiments (solid lines), even when the front and rear target torque command values are changed by a step at time t1, the second torque command value and the fourth torque command value are zero from time t1 to t3. This can be said to be a state where an estimated value and a detected value of the motor rotation angular velocity coincide with each other. Therefore, according to the control device for an electric vehicle of the one or more embodiments, it can be suppressed that excess vibration suppression compensation (negative torque) is output from the F/B compensator in order to compensate for a torque component corresponding to a difference between an estimated value and a detected value of the front motor rotation angular velocity in the feedback control system as in the prior art (broken lines). Therefore, from time t1 to t3, the front final torque command value Tmf* and the rear final torque command value Tmrf* can both be output as torque command values intended by the driver.

As a result, even during the acceleration using the front and rear drive wheels, it is possible to obtain an acceleration intended by the driver. This is the effect achieved by correcting the motor rotation angular velocity estimated value using the filter configured based on the transfer function of the rear motor rotation angular velocity for the front drive wheels (or the front motor rotation angular velocity for the rear drive wheels).

While the control results on the driving side of the 4WD electric vehicle have been described, the control results during the regenerative operation are the same. That is, in the prior art, when the 4WD electric vehicle is decelerated, the second torque command value and the fourth torque command value are corrected to the positive torque side by excess vibration suppression compensation so that the deceleration is impeded, and therefore, it is not possible to obtain a deceleration intended by the driver. By contrast, according to the control device for an electric vehicle of one or more embodiments, like the control on the driving side described above, since it is possible to suppress the output of excess vibration suppression compensation (positive torque) from the vibration damping control F/B compensator, it is possible to realize a deceleration intended by the driver.

As described above, the control device for an electric vehicle of one or more embodiments is a device that realizes a control method for an electric vehicle that sets a motor torque command value based on vehicle information and controls torque of a first motor (motor 4f) connected to a first drive wheel which is one of a front drive wheel and a rear drive wheel (in one or more embodiments, the front drive wheel). The control device for an electric vehicle calculates a first torque command value by a feedforward computation based on the motor torque command value, detects a rotation angular velocity of the first motor, and estimates a rotation angular velocity of the first motor based on the first torque command value by using a vehicle model Gp(s) that simulates a transfer characteristic from a torque input to the first drive wheel to a rotation angular velocity of the first motor. Then, the control device calculates a second torque command value from a deviation between a detected value and an estimated value of the rotation angular velocity of the first motor by using a filter Hf(s)/Gp(s) composed of an inverse characteristic of the vehicle model Gp(s) and a band-pass filter Hf(s) with a center frequency close to a torsional vibration frequency of the vehicle, controls the torque of the first motor according to a front final torque command value obtained by adding the first torque command value and the second torque command value together, and corrects, when a braking/driving torque for a second drive wheel being the drive wheel other than the first drive wheel is input, the estimated value of the rotation angular velocity of the first motor based on the braking/driving torque. This correction calculates a motor rotation angular velocity correction amount by using a transfer function of the rotation angular velocity of the first motor for the second drive wheel, the transfer function modeled in advance, and corrects the estimated value of the rotation angular velocity of the first motor based on the motor rotation angular velocity correction amount.

Consequently, even when the braking/driving torque is input from the rear drive wheel, the estimated value and the detected value of the front motor rotation angular velocity can be made to coincide with each other, and therefore, it can be suppressed that excess vibration suppression compensation is output from the F/B compensator in order to compensate for a torque component corresponding to a divergence between the estimated value and the detected value of the front motor rotation angular velocity in the feedback control system.

A control device for an electric vehicle of one or more embodiments is supposed to be applied to the system configuration 2 described above. Hereinafter, the vibration damping control computation process that is performed at step S503 described above by the control device for an electric vehicle of one or more embodiments will be described with reference to FIG. 10.

Figure 10:
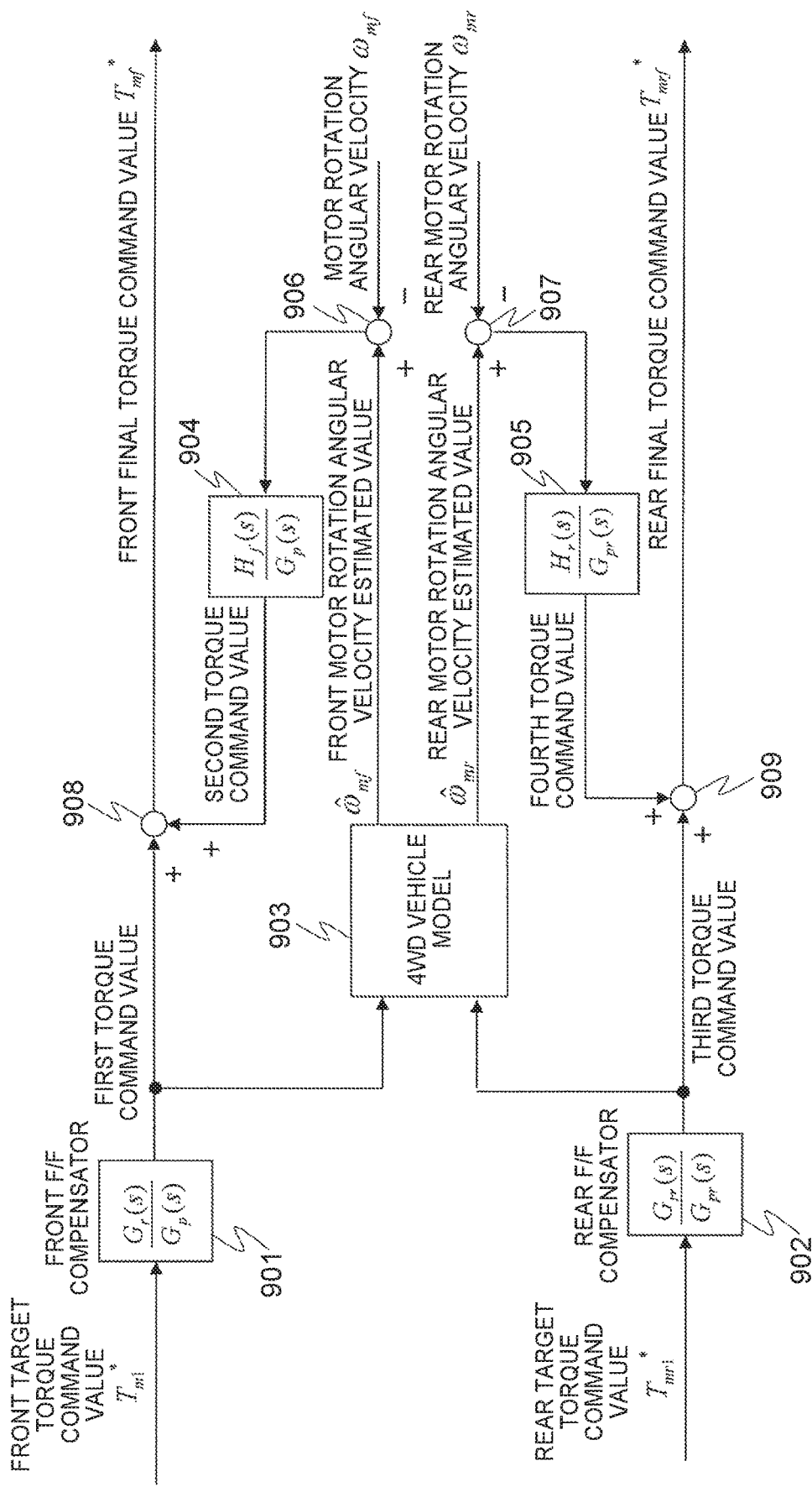
FIG. 10 is a block configuration diagram that realizes a vibration damping control computation process of one or more embodiments.

FIG. 10 is one example of a block configuration diagram that realizes the vibration damping control computation process of one or more embodiments. Control blocks illustrated in FIG. 10 include a front F/F compensator 901, a rear F/F compensator 902, a 4WD vehicle model 903, a control block 904, a control block 905, adders 908, 909, and subtractors 906, 907.

The front F/F compensator 901 is a filter that restrains front drive shaft torsional vibration, and is composed of a filter Gr(s)/Gp(s) given by the above formula (21). The front F/F compensator 901 calculates a first torque command value by using a front target torque command value Tm1* as an input and performing an F/F compensation process by the above formula (21).

The rear F/F compensator 902 is a filter that restrains rear drive shaft torsional vibration, and is composed of a filter Grr(s)/Gpr(s) given by the above formula (24). The rear F/F compensator 902 calculates a third torque command value by using a rear target torque command value Tmr1* as an input and performing an F/F compensation process by the above formula (24).

Figure 11:
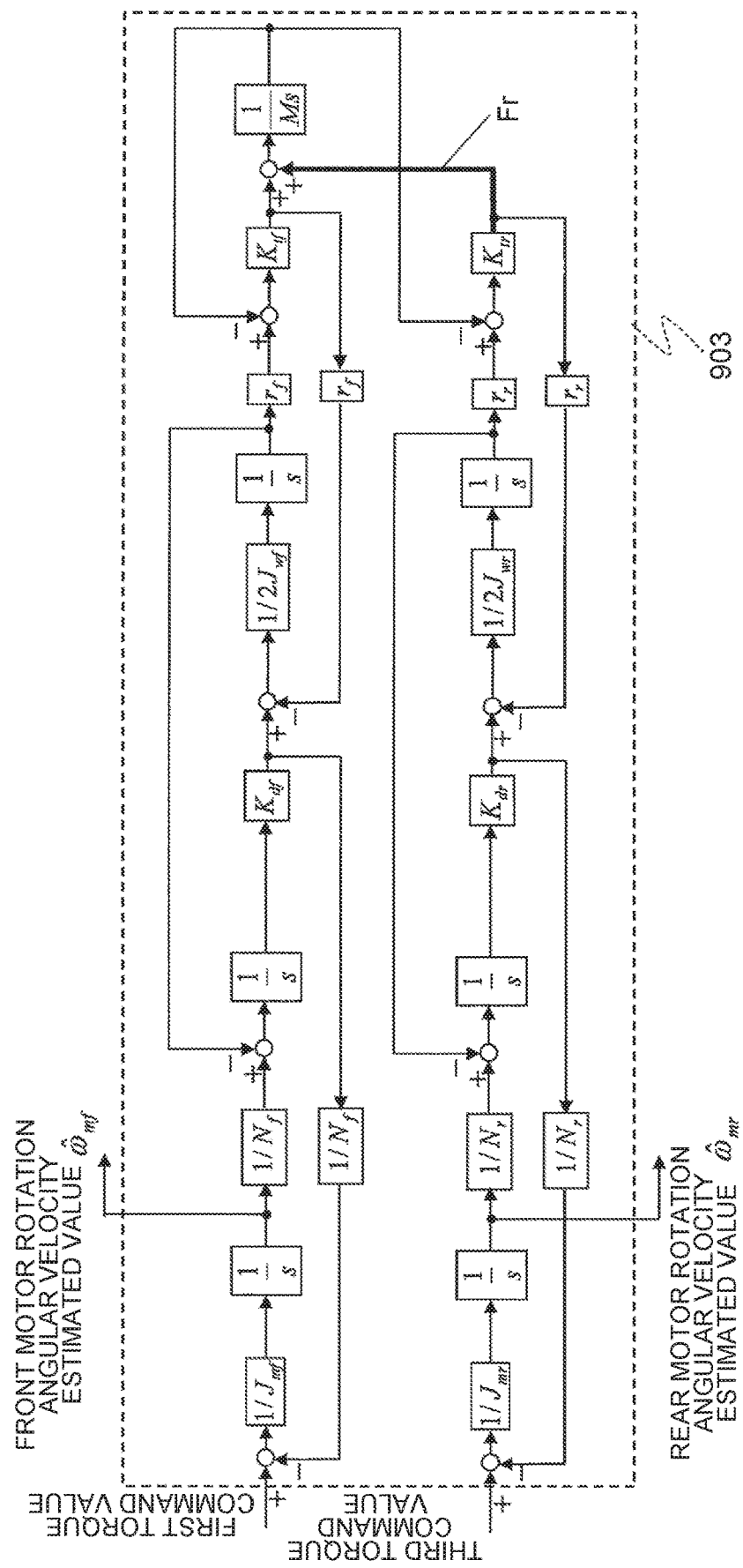
FIG. 11 is a block configuration diagram illustrating a 4WD vehicle model of one or more embodiments.

The 4WD vehicle model 903 calculates a front motor rotation angular velocity estimated value $\hat{\omega}mf$ and a rear motor rotation angular velocity estimated value $\hat{\omega}mr$ by using the first torque command value and the third torque command value as inputs and using a vehicle model illustrated in FIG. 11. As illustrated in FIG. 11, the vehicle model used herein is a vehicle model that simulates a driving force transmission system of a four-wheel drive vehicle (4WD vehicle) having front drive wheels and rear drive wheels, i.e. a transfer characteristic from torque inputs to the front drive wheels and the rear drive wheels to motor rotation angular velocities of a front drive motor and a rear drive motor. The 4WD vehicle model 903 illustrated in FIG. 11 is a block configuration diagram that is configured equivalent to the equation of motion (1) to (11) of the 4WD vehicle.

Herein, in the illustrated 4WD vehicle model 903, a driving force Fr for the rear drive wheels calculated based on the third torque command value is added to a system that calculates the front motor rotation angular velocity estimated value $\hat{\omega}mf$ based on the first torque command value. Consequently, in the 4WD vehicle model, the front motor rotation angular velocity estimated value calculated based on the first torque command value can be corrected based on the third torque command value indicating a braking/driving torque for the rear drive wheels.

The subtractor 906 illustrated in FIG. 10 subtracts a motor rotation angular velocity ωmf (detected value) from the front motor rotation angular velocity estimated value $\hat{\omega}mf$ to calculate a deviation between the estimated value and the detected value of the motor rotation angular velocity and outputs the calculated value to the control block 904.

The control block 904 is composed of a band-pass filter Hf(s) given by the above formula (34) and an inverse characteristic of a vehicle model Gp(s) given by the above formula (19). The control block 804 calculates a second torque command value by using as an input the deviation between the estimated value and the detected value of the motor rotation angular velocity and multiplying the deviation by Hf(s)/Gp(s).

The adder 908 adds the first torque command value and the second torque command value to calculate a front final torque command value Tmf*.

On the other hand, the subtractor 907 subtracts a motor rotation angular velocity ωmr (detected value) from the rear motor rotation angular velocity estimated value $\hat{\omega}mr$ to calculate a deviation between the estimated value and the detected value of the motor rotation angular velocity and outputs the calculated value to the control block 905.

The control block 905 is composed of a band-pass filter Hr(s) given by the above formula (35) and an inverse characteristic of the vehicle model Gp(s) given by the above formula (19). The control block 804 calculates a fourth torque command value by using as an input the deviation between the estimated value and the detected value of the motor rotation angular velocity and multiplying the deviation by Hr(s)/Gpr(s).

The adder 909 adds the first torque command value and the second torque command value to calculate a rear final torque command value Tmrf*.

Figure 12:
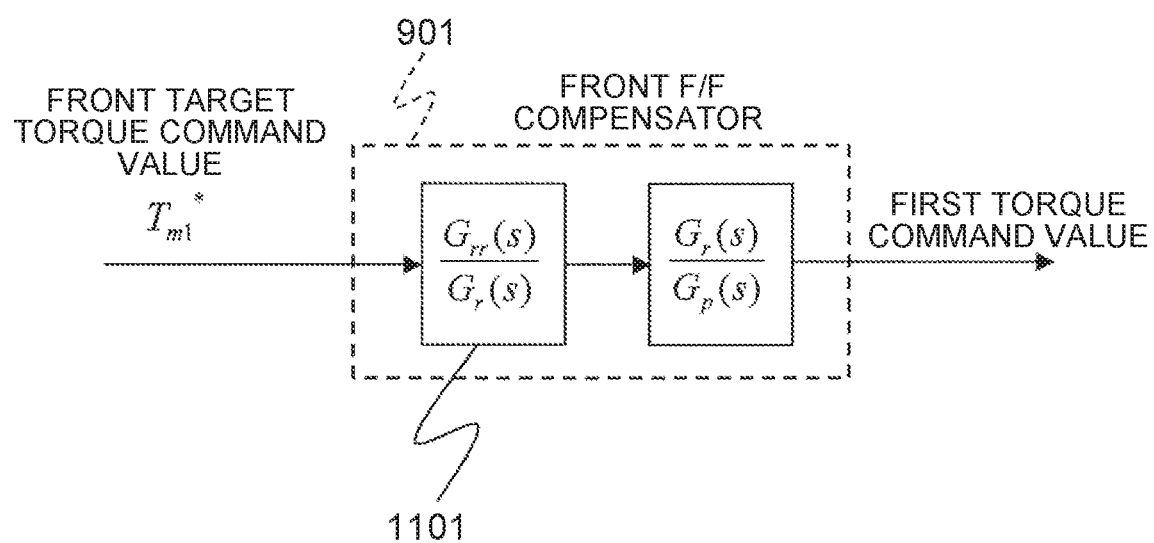
FIG. 12 is a block configuration diagram illustrating a front F/F compensator of one or more embodiments.

Herein, when a drive shaft torsional resonance frequency fpf of the front drive system and a drive shaft torsional resonance frequency fpr of the rear drive system differ from each other (fpf≠fpr), a model response of the F/F compensation process performed by the front F/F compensator 901 and a model response of the F/F compensation process performed by the rear F/F compensator 902 may be matched to each other in order to match driving force responses of the front drive wheels and the rear drive wheels to each other. That is, as illustrated in FIG. 12, by taking into account a control block 1101 in the configuration of the front F/F compensator 901, the model response of the F/F compensation process performed by the front F/F compensator 901 and the model response of the F/F compensation process performed by the rear F/F compensator 902 can be matched to each other.

Consequently, the rise and fall of front and rear torques when a driver performs an ON/OFF operation of an accelerator can be respectively matched so that it is possible to suppress the occurrence of two-step acceleration feeling due to difference in the response speeds of driving forces of the front and rear drive wheels. Further, when designing an outer-loop control system of vibration damping control, the design of the control system can be facilitated by matching the model responses of the plurality of drive wheels to each other.

The control block 1101 is composed of a filter Gr(s)/Gp(s) given by the following formula (36).

[Formula 36]

$$\frac{G_{rr}}{G_r} = \frac{(s^2 + 2\omega_{pr} + \omega_{pr}^2)}{(s^2 + 2\omega_{prr} + \omega_{prr}^2)} \quad (36)$$

Figure 13:
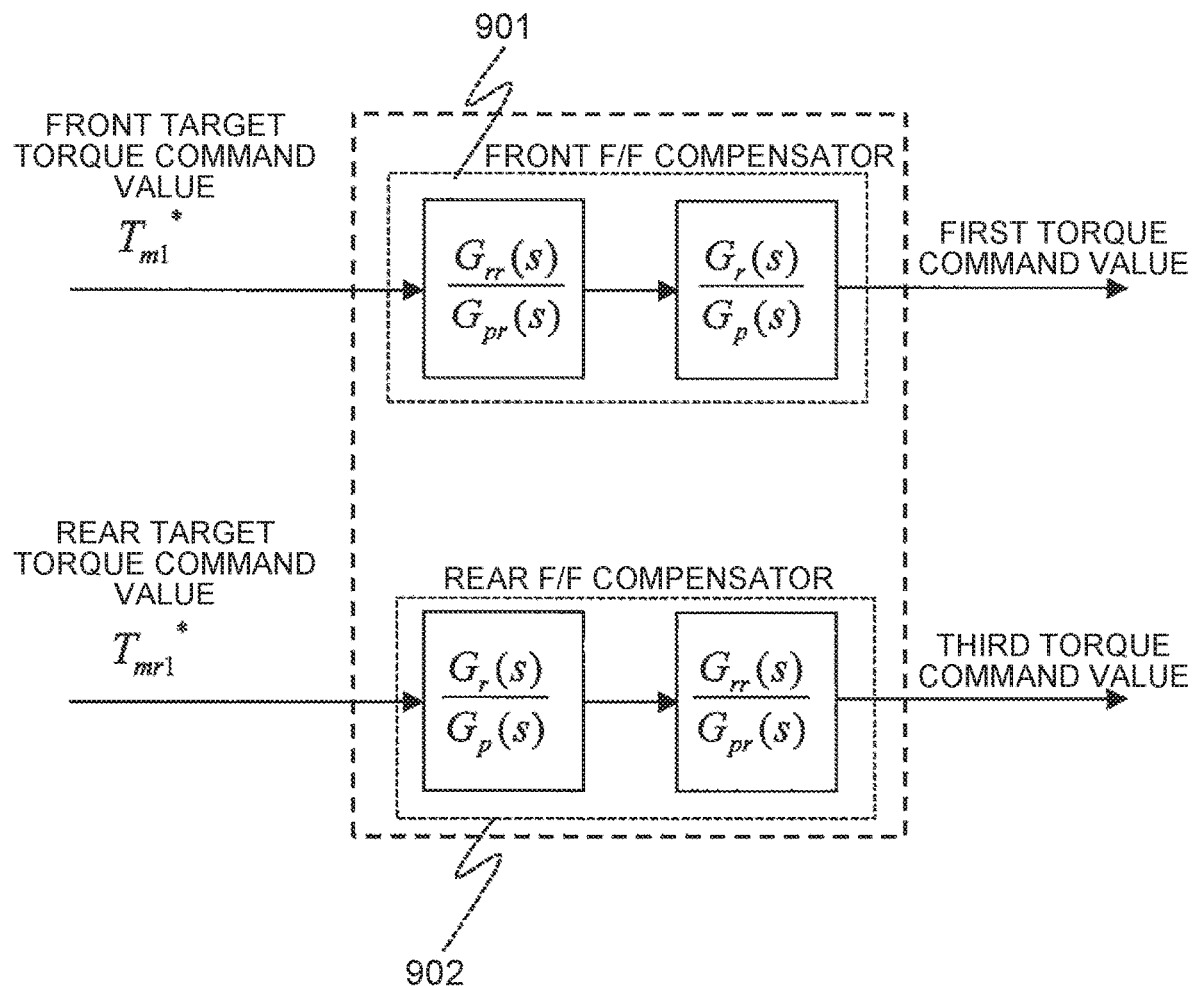
FIG. 13 is a block configuration diagram illustrating front and rear F/F compensators of one or more embodiments.

Alternatively, when fpf≠fpr, the front F/F compensator 901 and the rear F/F compensator 902 may be configured as illustrated in FIG. 13 in order to match the driving force responses of the front drive wheels and the rear drive wheels to each other. That is, the front F/F compensator 901 and the rear F/F compensator 902 may each be composed of both the filter Gr(s)/Gp(s) that restrains front drive shaft torsional vibration, and the filter Grr(s)/Gpr(s) that restrains rear drive shaft torsional vibration. Also with this configuration, the model response of the F/F compensation process performed by the front F/F compensator 901 and the model response of the F/F compensation process performed by the rear F/F compensator 902 can be matched to each other.

According to such a configuration, since the torsional vibration frequencies of the plurality of drive wheels are all damped, it is possible to suppress all drive shaft torsional vibration only by the front and rear F/F compensators 901, 902.

Figure 14:
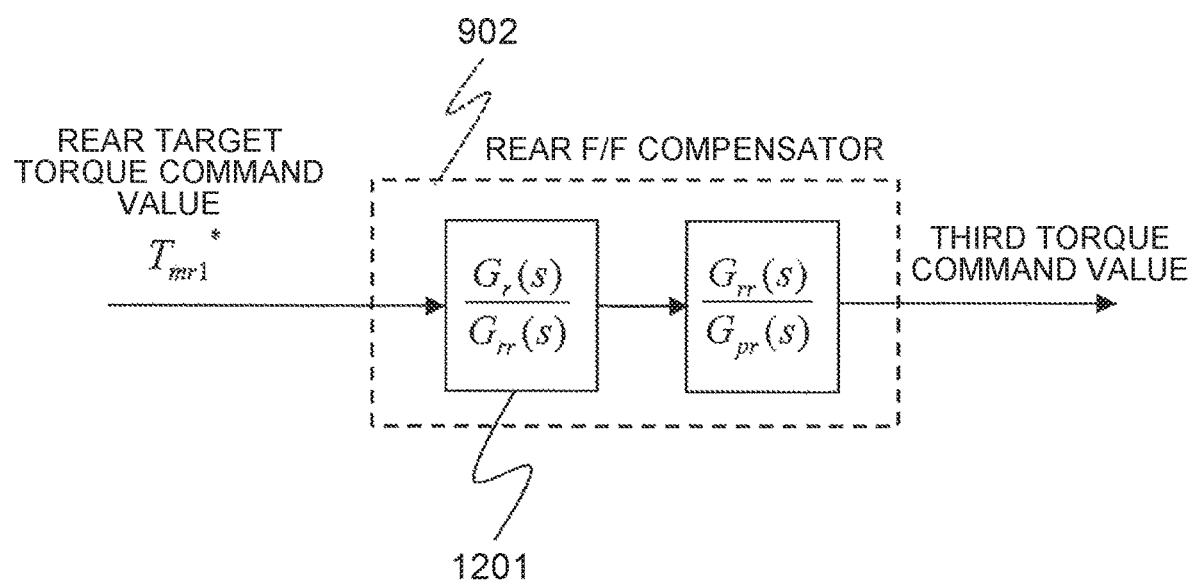
FIG. 14 is a block configuration diagram illustrating a rear F/F compensator of one or more embodiments.

When the drive shaft torsional resonance frequency fpf of the front drive system is smaller than the drive shaft torsional resonance frequency fpr of the rear drive system (fpf<fpr), the F/F compensation process of the rear F/F compensator 902 on the high-frequency side may be taken into account on the F/F compensation process side of the front F/F compensator 901 in order to match the model responses of the front and rear drive wheels to the characteristics on the low-frequency side. That is, as illustrated in FIG. 14, by taking into account a control block 1201 in the configuration of the rear F/F compensator 902, the driving force responses of the front and rear drive wheels can be matched to the characteristics on the lower-frequency side. The control block 1201 is composed of a filter Gr(s)/Grr(s) having an inverse characteristic of a vehicle model Grr(s) given by the above formula (23) and a vehicle model Gr(s) given by the above formula (20).

Herein, when the model responses of the plurality of drive wheels are matched to the high-frequency side, lead compensation is required for the drive wheels having a drive shaft torsional vibration frequency characteristic on the low-frequency side, and therefore, a torque command value indicating a torque equal to or greater than a torque required by a driver is set for those drive wheels. However, since there are upper and lower limits of torque or the like in the full-open acceleration or the like, there are cases where when the lead compensation is performed, a torque according to the model response cannot be output. Therefore, in one or more embodiments, the model responses of the plurality of drive wheels are matched to the low-frequency side.

By the rear final torque command value Tmrf* and the front final torque command value Tmf* calculated as described above, it is also possible to suppress the output of excess vibration suppression compensation from a vibration damping control F/B compensator as indicated by the control results illustrated in FIG. 9 described above (see the one or more embodiments in the figure), and therefore, it is possible to obtain an acceleration intended by a driver even during the acceleration using the front and rear drive wheels.

As described above, when the electric vehicle includes a second motor (rear drive motor) as a power source for the second drive wheel (rear drive wheel), the vehicle model Gp(s) is a 4WD vehicle model that simulates a transfer characteristic from torque inputs to the first drive wheel and the second drive wheel to motor rotation angular velocities of the first motor and the second motor, and the control device for an electric vehicle of one or more embodiments calculates a third torque command value by a feedforward computation based on the motor torque command value, detects a rotation angular velocity of the second motor, calculates a fourth torque command value from a deviation between a detected value and an estimated value of the rotation angular velocity of the second motor by using a filter Hr(s)/Gpr(s) composed of an inverse characteristic of a vehicle model Gpr(s) that simulates a transfer characteristic from a torque input to the second drive wheel to a motor rotation angular velocity of the second motor, and a band-pass filter Hr(s) with a center frequency close to a torsional vibration frequency of the vehicle, and controls torque of the second motor according to a second final torque command value obtained by adding the third torque command value and the fourth torque command value together. Then, the control device calculates a rotation angular velocity estimated value of the first motor and a rotation angular velocity estimated value of the second motor by using the first torque command value and the third torque command value as inputs and using the 4WD vehicle model, and corrects the rotation angular velocity estimated value of the first motor based on the third torque command value.

Consequently, even when the braking/driving torque is input from the rear drive wheel, the estimated value and the detected value of the front motor rotation angular velocity can be made to coincide with each other by using the 4WD vehicle model designed aiming at a plurality of drive wheels. Therefore, it can be suppressed that excess vibration suppression compensation is output from the F/B compensator in order to compensate for a torque component corresponding to a divergence between the estimated value and the detected value of the front motor rotation angular velocity in the feedback control system.

Further, according to the control device for an electric vehicle of one or more embodiments, when a drive shaft torsional vibration frequency of the first drive wheel (front drive wheel) and a drive shaft torsional vibration frequency of the second drive wheel (rear drive wheel) differ from each other, a model response used in the feedforward computation that calculates the first torque command value and a model response used in the feedforward computation that calculates the third torque command value are matched to each other. Consequently, the rise and fall of front and rear torques when a driver performs an ON/OFF operation of an accelerator can be respectively matched so that it is possible to suppress the occurrence of two-step acceleration feeling due to difference in the response speeds of driving forces of the front and rear drive wheels.

Further, according to the control device for an electric vehicle of one or more embodiments, the first torque command value may be calculated by the feedforward computation using a filter having a transfer characteristic that damps the drive shaft torsional vibration frequency of the first drive wheel (front drive wheel), and the third torque command value may be calculated by the feedforward computation using a filter having a transfer characteristic that damps the drive shaft torsional vibration frequency of the second drive wheel (rear drive wheel). Consequently, since the torsional vibration frequencies of the plurality of drive wheels are all damped, it is possible to suppress all drive shaft torsional vibration only by the front and rear F/F compensators.

Further, according to the control method for an electric vehicle of one or more embodiments, when the drive shaft torsional vibration frequency of the second drive wheel (rear drive wheel) is smaller than the drive shaft torsional vibration frequency of the first drive wheel (front drive wheel), the model response used in the feedforward computation that calculates the first torque command value is matched to the model response used in the feedforward computation that calculates the third torque command value. When the drive shaft torsional vibration frequency of the first drive wheel is smaller than the drive shaft torsional vibration frequency of the second drive wheel, the model response used in the feedforward computation that calculates the third torque command value is matched to the model response used in the feedforward computation that calculates the first torque command value. Consequently, the rise and fall of front and rear torques when a driver performs an ON/OFF operation of an accelerator can be respectively matched without the need for lead compensation so that it is possible to suppress the occurrence of two-step acceleration feeling due to difference in the response speeds of driving forces of the front and rear drive wheels.

A control device for an electric vehicle of one or more embodiments is supposed to be applied to the system configuration 1 described above. Hereinafter, the vibration damping control computation process that is performed at step S203 described above by the control device for an electric vehicle of one or more embodiments will be described with reference to the drawings and so on.

First, a vehicle model used in the vibration damping control computation process in one or more embodiments will be described.

Figure 15:
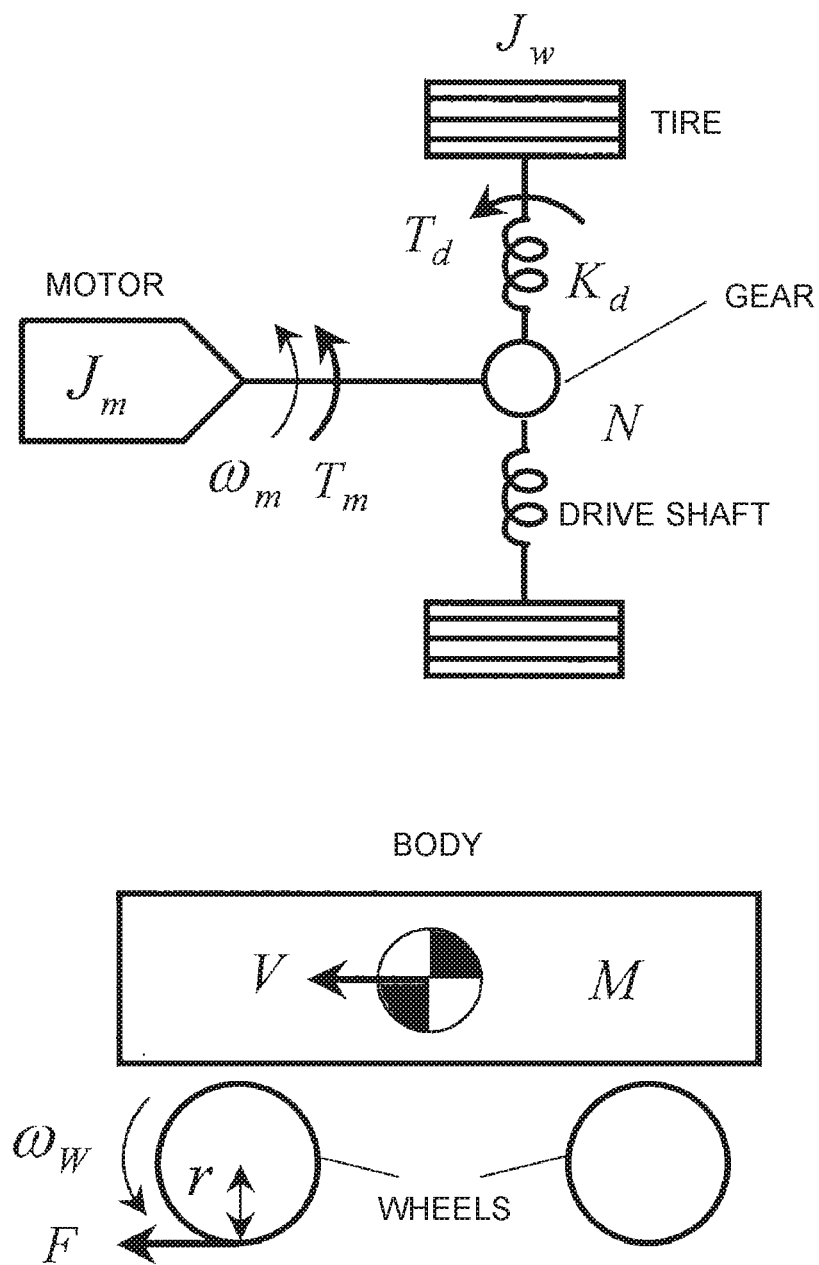
FIG. 15 is a diagram for explaining the equation of motion of a 2WD vehicle.

FIG. 15 is a diagram modeling the driving force transmission system of the vehicle of the system configuration 1, and respective parameters in the same figure are as follows.

$J_m$: motor inertia
$J_w$: drive wheel inertia (for one shaft)
M: vehicle body weight
$K_d$: torsional rigidity of driving system
$K_t$: coefficient for friction between tire and road surface
N: overall gear ratio
r: tire loaded radius
$\omega_m$: motor rotation angular velocity
$\theta_m$: motor rotation angle
$\omega_w$: drive wheel rotation angular velocity
$\theta_w$: drive wheel rotation angle
$T_m$: motor torque
$T_d$: drive shaft torque
F: driving force (for two shafts)
V: vehicle body speed
$\theta_d$: drive shaft torsion angle From FIG. 14, the equation of motion of the two-wheel drive vehicle (2WD vehicle) is given by the following formulas (37) to (42).

[Formula 37]
$$J_m \cdot \dot{\omega}_m = T_m - T_d/N \tag{37}$$

[Formula 38]
$$2J_w \cdot \dot{\omega}_w = T_d - rF \tag{38}$$

[Formula 39]
$$M \cdot \dot{V} = F \tag{39}$$

[Formula 40]
$$T_d = K_d \cdot \theta_d \tag{40}$$

[Formula 41]
$$F = K_t \cdot (r\omega_m - V) \tag{41}$$

[Formula 42]
$$\theta_d = \theta_m/N_{af} - \theta_w \tag{42}$$

By the Laplace-transform of the above formulas (37) to (42), a transfer characteristic from a motor torque $T_m$ to a motor rotation speed $\omega_m$ is obtained as given by the following formulas (43) and (44).

[Formula 43]
$$\omega_m = G_p(s) \cdot T_m \tag{43}$$

[Formula 44]
$$G_p(s) = \frac{1}{s} \cdot \frac{b_3 s^3 + b_2 s^2 + b_1 s + b_0}{a_3 s^3 + a_2 s^2 + a_1 s + a_0} \tag{44}$$

where $a_3$, $a_2$, $a_1$, $a_0$, $b_3$, $b_2$, $b_1$, and $b_0$ in the formula (44) are respectively given by the following formula (45).

[Formula 45]
$$a_3 = 2J_m J_w M$$

$a_2 = K_t J_m (2J_w + r^2 M)$ $a_1 = K_d M(J_m + 2J_w/N^2)$ $a_0 = K_d K_t (J_m + 2J_w/N^2 + rM/N^2)$ $b_3 = 2J_w M$ $b_2 = K_t(2J_w + r^2 M)$ $b_1 = K_d M$ $b_0 = K_d K_t$ \hfill (45)

Further, a transfer characteristic from the motor torque $T_m$ to a drive shaft torque $T_d$ is given by the following formula (46).

[Formula 46]

$$\frac{T_d}{T_m} = \frac{c_1 s + c_0}{a_3 s^3 + a_2 s^2 + a_1 s + a_0} \tag{46}$$

where $c_1$ and $c_2$ in the formula (46) are given by the following formula (47).

[Formula 47]

$c_1 = 2K_d J_w M/N$ $c_0 = K_d K_t (2J_w + r^2 M)/N$ \hfill (47)

From the formulas (38), (40), (41), and (42), a transfer characteristic from the motor rotation speed Wm to a drive wheel rotation angular velocity $\omega_w$ is obtained as given by the following formula (48).

[Formula 48]

$$\frac{\omega_w}{\omega_m} = \frac{b_1 s + b_0}{b_3 s^3 + b_2 s^2 + b_1 s + b_0} \cdot \frac{1}{N} \tag{48}$$

From the formulas (43), (44), and (48), a transfer characteristic from the motor torque Tm to the drive wheel rotation angular velocity $\omega_w$ is given by the following formula (49).

[Formula 49]

$$\frac{\omega_w}{T_m} = \frac{1}{N} \cdot \frac{1}{s} \cdot \frac{b_1 s + b_0}{a_3 s^3 + a_2 s^2 + a_1 s + a_0} \tag{49}$$

From the formulas (46) and (49), a transfer characteristic from the drive shaft torque $T_d$ to the drive wheel rotation angular velocity $\omega_w$ is given by the following formula (50).

[Formula 50]

$$\omega_w = \frac{1}{N} \cdot \frac{1}{s} \cdot \frac{b_1 s + b_0}{c_1 s + c_0} T_d \tag{50}$$

Herein, the formula (50) is transformed into the following formula (51).

[Formula 51]

$$\frac{\omega_m}{N} = \frac{1}{J_m N} \frac{1}{s} T_m - \frac{1}{J_m N^2 s} T_d \tag{51}$$

Therefore, from the formulas (50) and (51), a drive shaft torsional angular velocity $\omega_d$ is given by the following formula (52).

[Formula 52]

$$\begin{aligned}\omega_d &= \frac{\omega_m}{N} - \omega_w = \frac{1}{J_m N} \frac{1}{s} T_m - \frac{1}{J_m N^2 s} T_d - \\ &\quad \frac{1}{N} \cdot \frac{1}{s} \cdot \frac{b_1 s + b_0}{c_1 s + c_0} T_d \\ &= \frac{1}{s} \cdot \left( \frac{T_m}{J_m N} - H_w(s) \cdot T_d \right) \end{aligned} \tag{52}$$

where $H_w(s)$ in the formula (52) is given by the following formula (53).

[Formula 53]

$$H_w(s) = \frac{v_1 s + v_0}{w_1 s + w_0} \tag{53}$$

where $v_1$, $v_0$, $w_1$, and $w_0$ in the formula (53) are given by the following formula (54).

[Formula 54]

$v_1 = J_m N b_1 + c_1 = 2J_w MN(J_m + K_d/N^2)$ $v_0 = J_m N b_0 + c_0 = K_d K_t (2J_m N^2 + 2J_w + r^2 M)/N$ $w_1 = J_m N^2 c_1 = 2K_d J_m J_w MN$ $w_0 = J_m N^2 c_0 = K_d K_t J_m (2J_w + r^2 M)N$ \hfill (54)

The formula (54) can be transformed into the following formula (55).

[Formula 55]

$$\frac{T_d}{T_m} = \frac{c_1 s + c_0}{a_3 s^3 + a_2 s^2 + a_1 s + a_0} = \frac{c_1}{a_3} \cdot \frac{s + c_0/c_1}{(s + \alpha)(s^2 + 2\zeta_p \omega_p s + \omega_p^2)} \tag{55}$$

Herein, in the formula (55), $\zeta_p$ a damping coefficient of a drive shaft torque transmission system, and $\omega_p$ is a natural vibration frequency of the drive shaft torque transmission system.

Further, poles and zero points of the formula (55) are examined. Since $\alpha \approx c_0/c_1$, the following formula (56) is obtained by pole-zero cancellation.

[Formula 56]

$$T_d = \frac{g_t}{s^2 + 2\zeta_p \omega_p s + \omega_p^2} T_m \tag{56}$$

where $g_t$ in the formula (56) is given by the following formula (57).

[Formula 57]

$$g_t = c_0/(\alpha_3 \cdot \alpha) \tag{57}$$

Herein, a final torque command value Tmf* can be given by the following formula (58).

[Formula 58]

$$T_{mf}^* = T_m^* - k_1 \omega_d \tag{58}$$

Then, the final torque command value Tmf* can be replaced as given by the following formula (59).

[Formula 59]

$$T_{mf}^* T_m^* - (k_1 s) T_d/K_d \tag{59}$$

Then, the formula (59) is substituted into the formula (56) given that motor torque Tm=final torque command value Tmf* (Tm=Tmf*), so that the formula (56) can be rearranged as given by the following formula (60).

[Formula 60]

$$T_d = \frac{g_t}{s^2 + (2\zeta_p \omega_p + g_t k_1/K_d)s + \omega_p^2} T_m^* \tag{60}$$

A model response from the motor torque to the drive shaft torque is given by the following formula (61).

[Formula 61]

$$T_d = \frac{g_t}{s^2 + 2\zeta_r \omega_p s + \omega_p^2} T_m^* \tag{61}$$

When the model response is given by the formula (61), a condition under which the transfer characteristic (formula (60)) from the final torque command value Tmf* to the drive shaft torque $T_d$ and the model response are matched to each other is given by the following formula (62).

[Formula 62]

$$K_1 = 2(1-\zeta_p)\omega_p K_d/g_1 \tag{62}$$

Subsequently, by applying the above formulas (37) to (53), a dead zone that simulates a gear backlash characteristic from the motor to the drive shafts is modeled (dead zone model). Then, the drive shaft torque Td taking into account the dead zone model can be given by the following formula (63).

[Formula 63]

$$T_d = \begin{cases} K_d(\theta_d - \theta_{dead}/2) & (\theta_d \geq \theta_{dead}/2) \\ 0 & (-\theta_{dead}/2 < \theta_d < \theta_{dead}/2) \\ K_d(\theta_d + \theta_{dead}/2) & (\theta_d \leq -\theta_{dead}/2) \end{cases} \tag{63}$$

where $\theta_{dead}$ is an overall gear backlash amount from the motor to the drive shafts.

Figure 16:
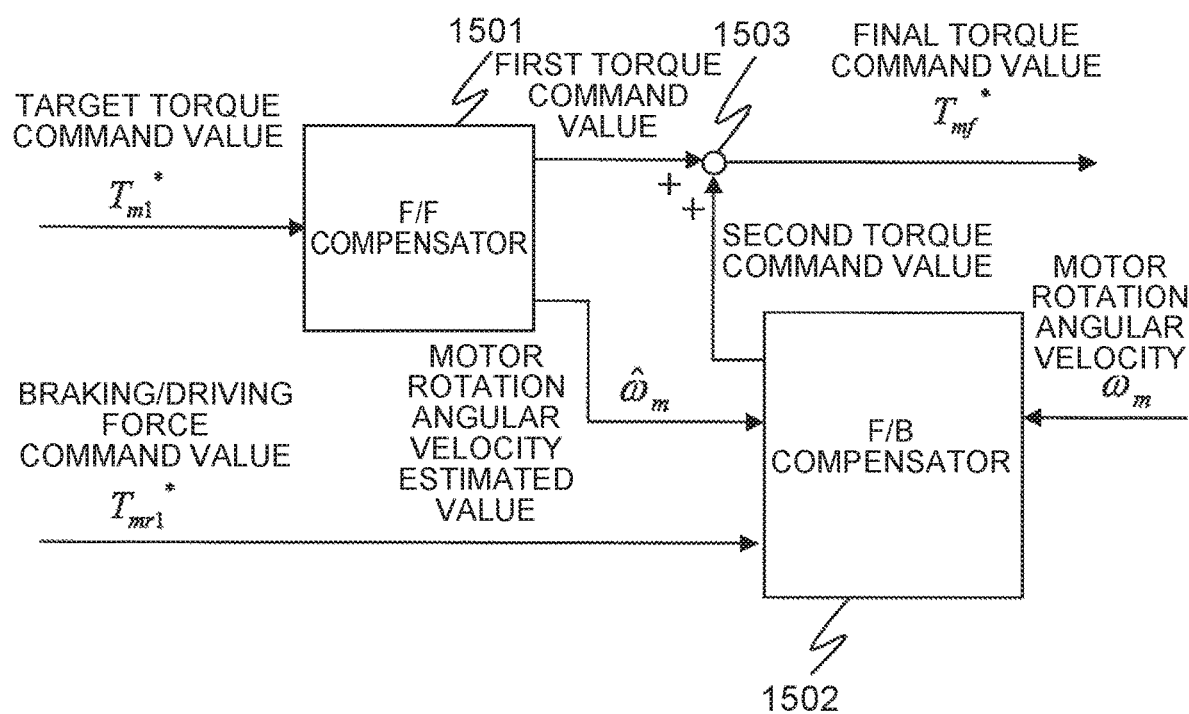
FIG. 16 is a block configuration diagram that realizes a vibration damping control computation process of one or more embodiments.

FIG. 16 is a control block diagram for explaining the vibration damping control computation process performed at step S203. The vibration damping control computation process of one or more embodiments is performed by using an F/F compensator 1501, an F/B compensator 1502, and an adder 1503.

Using a target torque command value Tm* as an input, the F/F compensator 1501 calculates a first torque command value Tm1* and a motor rotation angular velocity estimated value ω^m for the first torque command value Tm1*.

The F/B compensator 1502 calculates a second torque command value Tm2* by using as inputs the motor rotation angular velocity estimated value ω^m, a motor rotation speed detected value ω^m, and a braking/driving force command value Tmr1*.

The adder 1503 adds the first torque command value Tm1* and the second torque command value Tm2* to output a final torque command value Tmf*.

Figure 17:
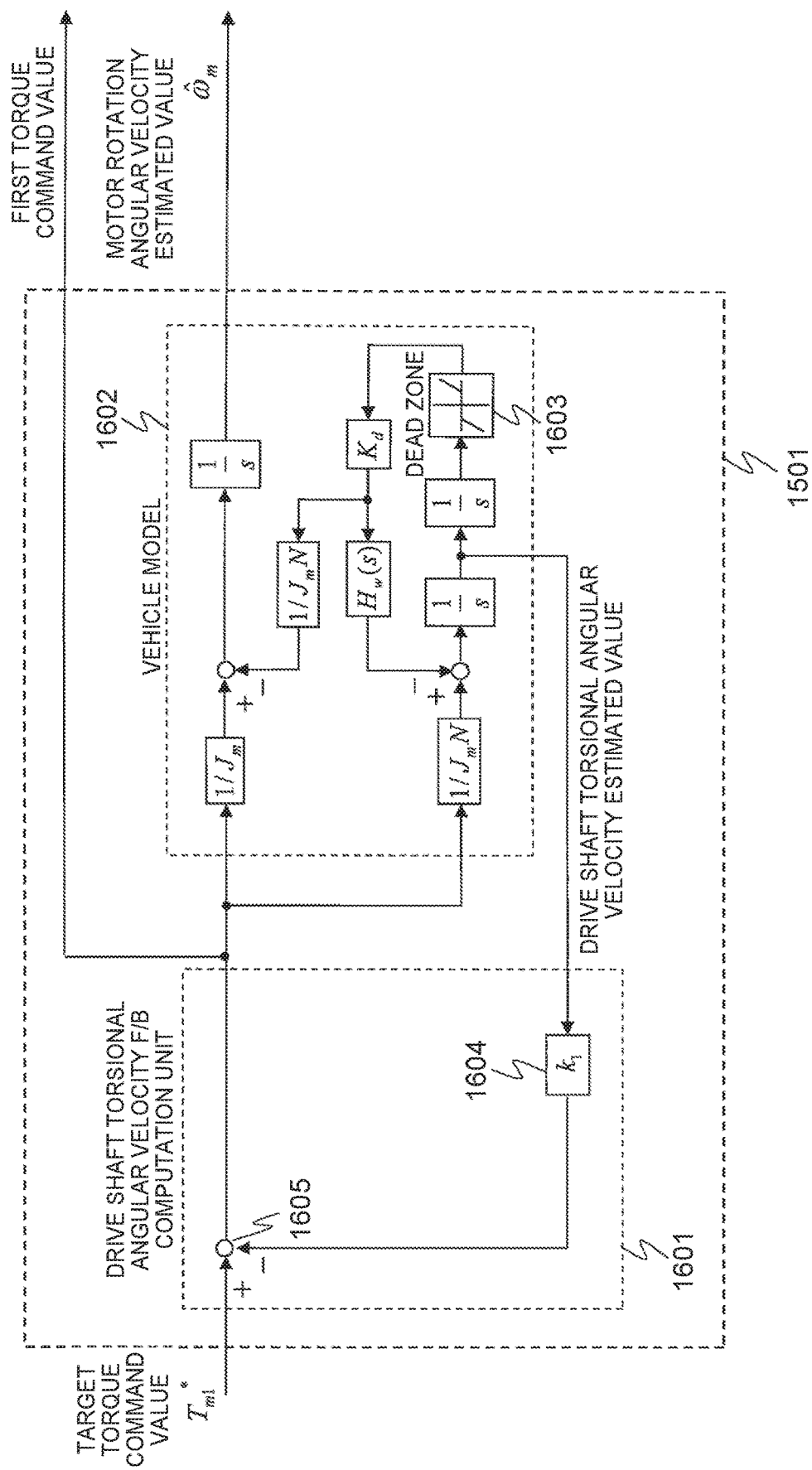
FIG. 17 is a block configuration diagram illustrating an F/F compensator of one or more embodiments.

FIG. 17 is a control block diagram illustrating details of the F/F compensator 1501 illustrated in FIG. 16. The F/F compensator 1501 is composed of a drive shaft torsional angular velocity F/B computation unit 1601 and a vehicle model 1602. Note that the F/F compensator 1501 illustrated herein is the same as an F/F compensator disclosed in International Publication No. WO 2013/157315.

The vehicle model 1602 is composed of a dead zone model that simulates the vehicle parameters (see FIG. 15) and the gear backlash from the motor 4 to the drive shafts 8 by applying the formulas (37) to (48). In the vehicle model 1602, the drive shaft torque Td taking into account a dead zone characteristic (dead zone model) indicated by a dead zone block 1603 is calculated by applying the above formula (63).

Herein, in a scene such as acceleration of the vehicle from coasting or deceleration, there occurs a dead zone period during which drive motor torque is not transmitted to the drive shafts due to the influence of the gear backlash. In this regard, by calculating the first torque command value using the vehicle model 1602 in which the dead zone period is considered, the drive motor torque is controlled to be approximately zero in the dead zone period and to increase at the timing when gears mesh with each other. Therefore, in the case where the gears are disengaged due to the influence of the gear backlash, it is possible suppress a shock when the gears mesh with each other again.

Using the first torque command value as an input, the vehicle model 1602 calculates a drive shaft torsional angular velocity estimated value ω^d and the motor rotation angular velocity estimated value ω^m.

Then, the motor rotation angular velocity estimated value output from the vehicle model 1602 is input to the F/B compensator 1502 (see FIG. 16), and the drive shaft torsional angular velocity estimated value ω^d is input to the drive shaft torsional angular velocity F/B computation unit 1601.

The drive shaft torsional angular velocity F/B computation unit 1601 includes a feedback gain 1604 (F/B gain $k_1$) and a subtractor 1605. The drive shaft torsional angular velocity F/B computation unit 901 calculates the first torque command value by using as inputs the target torque command value Tm1* and the drive shaft torsional angular velocity estimated value ω^d.

Using the drive shaft torsional angular velocity estimated value ω^d as an input, the feedback gain 1604 calculates a value by multiplying the drive shaft torsional angular velocity estimated value ω^d by an F/B gain $k_1$ that is calculated by applying the above formula (62) based on a damping coefficient $\zeta_{r1}$ according to a model response in a period other than the dead zone period, and outputs the calculated value to the subtractor 1605.

Then, the subtractor 1605 subtracts the output value of the feedback gain 1604 from the target torque command value to calculate the first torque command value. The first torque command value is output to the vehicle model 1602 and to the adder 1503 illustrated in FIG. 16.

Figure 18:
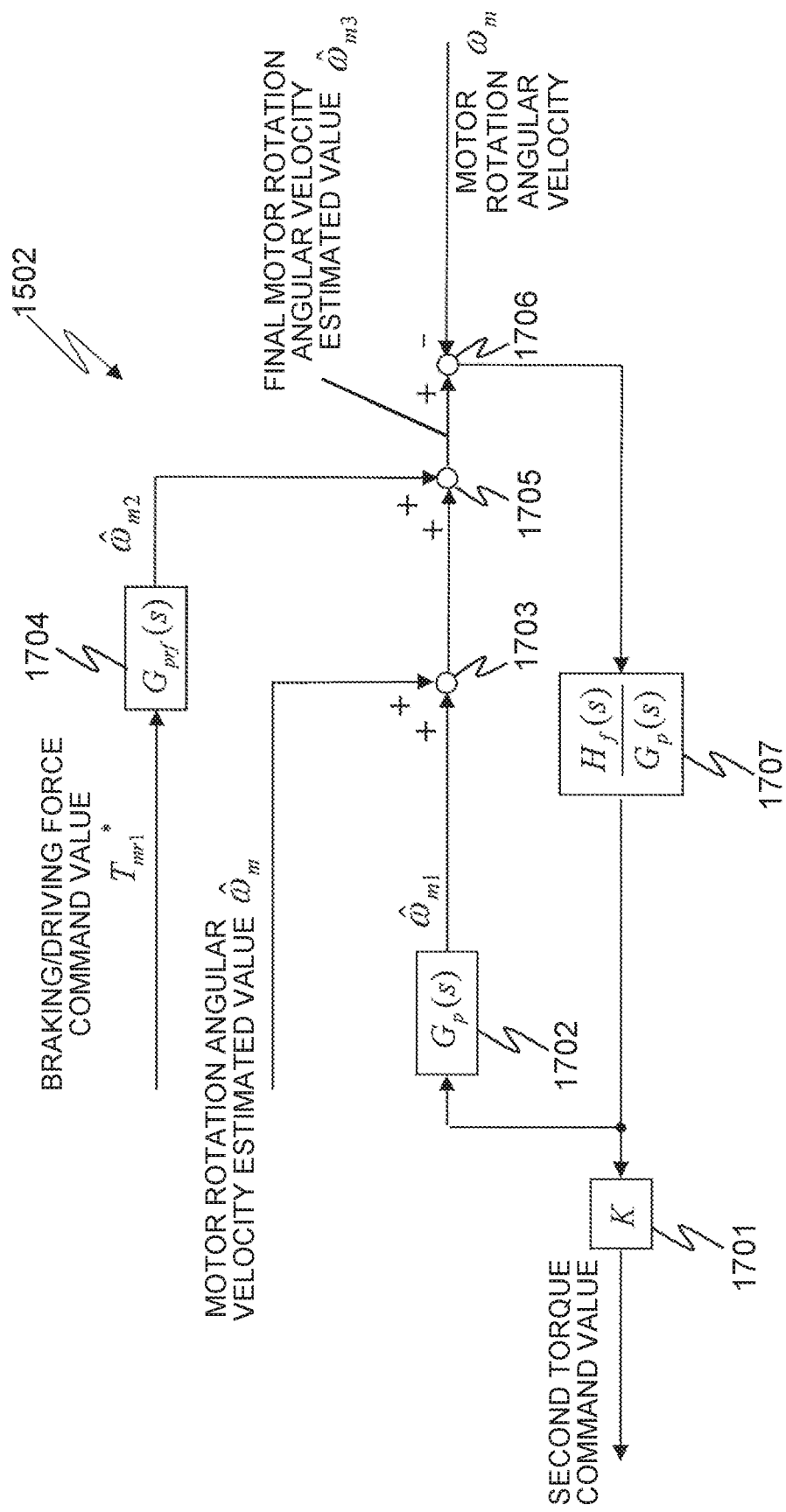
FIG. 18 is a block configuration diagram illustrating an F/B compensator of one or more embodiments.

FIG. 18 is a control block diagram illustrating details of the F/B compensator 1502 illustrated in FIG. 16. The F/B compensator 1502 is composed of a gain 1701 (gain K), a control block 1702, adders 1703, 1705, a control block 1704, a subtractor 1706, and a control block 1707.

The gain K is disposed for adjusting the safety margin (gain margin, phase margin) of the feedback control system and is set to a value equal to or less than 1.

The control block 1702 is a filter composed of the transfer characteristic Gp(s) given by the above formula (44). The control block 1702 calculates a motor rotation angular velocity estimated value ω^m1 by using as an input the second torque command value before gain adjustment by the filter gain K and using the transfer characteristic Gp(s).

The adder 1703 outputs to the adder 1705 a value obtained by adding together the motor rotation angular velocity estimated value ω^m calculated by the vehicle model 1602 included in the F/F compensator 1501 and the motor rotation angular velocity estimated value ω^m1 as the output of the control block 1702.

The control block 1704 is a filter composed of the transfer characteristic Gprf(s) given by the above formula (26). The control block 1704 calculates a motor rotation angular velocity estimated value ω^m2 by using the braking/driving force command value Tmr1* as an input and using the transfer characteristic Gprf(s).

Then, in the adder 1705, the value obtained by adding the motor rotation angular velocity estimated value ω^m and the motor rotation angular velocity estimated value ω^m1 together and the motor rotation angular velocity estimated value ω^m2 are added together. Consequently, the front motor rotation angular velocity estimated value calculated based on the first torque command value is corrected based on the braking/driving force command value indicating a braking/driving torque for the rear drive wheels, thereby calculating a final motor rotation angular velocity estimated value ω^m3.

The subtractor 1706 outputs to the control block 1707 a deviation between an estimated value and a detected value of the motor rotation angular velocity obtained by subtracting the motor rotation angular velocity ωm from the final motor rotation angular velocity estimated value ω^m3.

The control block 1707 is a filter Hf(s)/Gp(s) composed of an inverse characteristic of the transfer characteristic Gp(s) of the control object and a band-pass filter Hf(s). The band-pass filter Hf(s) is configured by applying the above formula (34) as in one or more embodiments. The control block 1707 calculates the second torque command value by using as an input the deviation between the estimated value and the detected value of the motor rotation angular velocity, which is the output of the subtractor 1706, and using the filter Hf(s)/Gp(s).

The transfer characteristic Gprf(s) of the control object used in the control block 1704 may be approximated by a filter configured by applying the following formula (64) which considers that the torsional vibration frequencies of the front and rear drive wheels become a cutoff frequency. Through the approximation by such a filter, the computation load can be reduced. Although the following formula (64) considers the torsional vibration frequencies of both the front and rear drive wheels, the transfer characteristic Gprf(s) may be approximated by a filter considering only the torsional vibration frequency of at least one of the drive wheels.

[Formula 64]

$$G_{prf} = \frac{1}{s} \cdot \frac{M''_{prf}}{(s+\omega_{pr})(s+\omega_{pf})} \tag{64}$$

The transfer characteristic Gprf(s) of the control object used in the control block 1704 may be approximated by a filter configured by applying the following formula (65) which considers only a characteristic of an element in a steady state (static characteristic). Consequently, since the motor rotation angular velocity estimated value ω^m2 can be calculated by gain adjustment without using the vehicle model, it is possible to reduce the software computation load of the electric motor controller 2.

[Formula 65]

$$G_{prf} = \frac{1}{s} \cdot M'''_{prf} \tag{65}$$

Further, when having a characteristic in which the damping coefficient due to the torsional vibration frequency becomes less than 1, the control block 1704 may use, instead of the transfer characteristic Gprf(s), the transfer characteristic Grrf(s) given by the above formula (29) in which the damping coefficient ζ (ζpr, ζpf) is approximated to 1. That is, when having a characteristic in which the damping coefficient due to the torsional vibration frequency becomes less than 1, the damping coefficient ζ (ζpr, ζpf) may be set to a value equal to or greater than 1. In a transfer function of the motor rotation angular velocity of the front drive motor from the rear drive wheels, when having a characteristic in which the damping coefficient due to the torsional vibration frequency in a denominator is less than 1, there is a characteristic such that the motor rotation angular velocity correction amount (motor rotation angular velocity estimated value ω^m2) becomes oscillatory according to changes in the braking/driving force. In this case, it is possible to suppress the oscillatory characteristic of the motor rotation angular velocity correction amount by setting the damping coefficient to a value equal to or greater than 1.

In addition, it has been described that, in one or more embodiments, the transfer characteristic Gp(s) used in the control block 1702 and the control block 1707 is configured based on the 2WD vehicle model given by the above formula (44). However, like in one or more embodiments described above, the transfer characteristic Gp(s) may be configured by applying the above formula (12) that is based on the 4WD vehicle model considering the front and rear driving force characteristics. Using the 4WD vehicle model that considers not only the front drive wheels but also the rear drive wheels, the motor rotation angular velocity can be estimated more accurately.

Herein, the vibration damping control results by the control device for an electric vehicle of one or more embodiments will be described with reference to FIG. 19.

Figure 19:
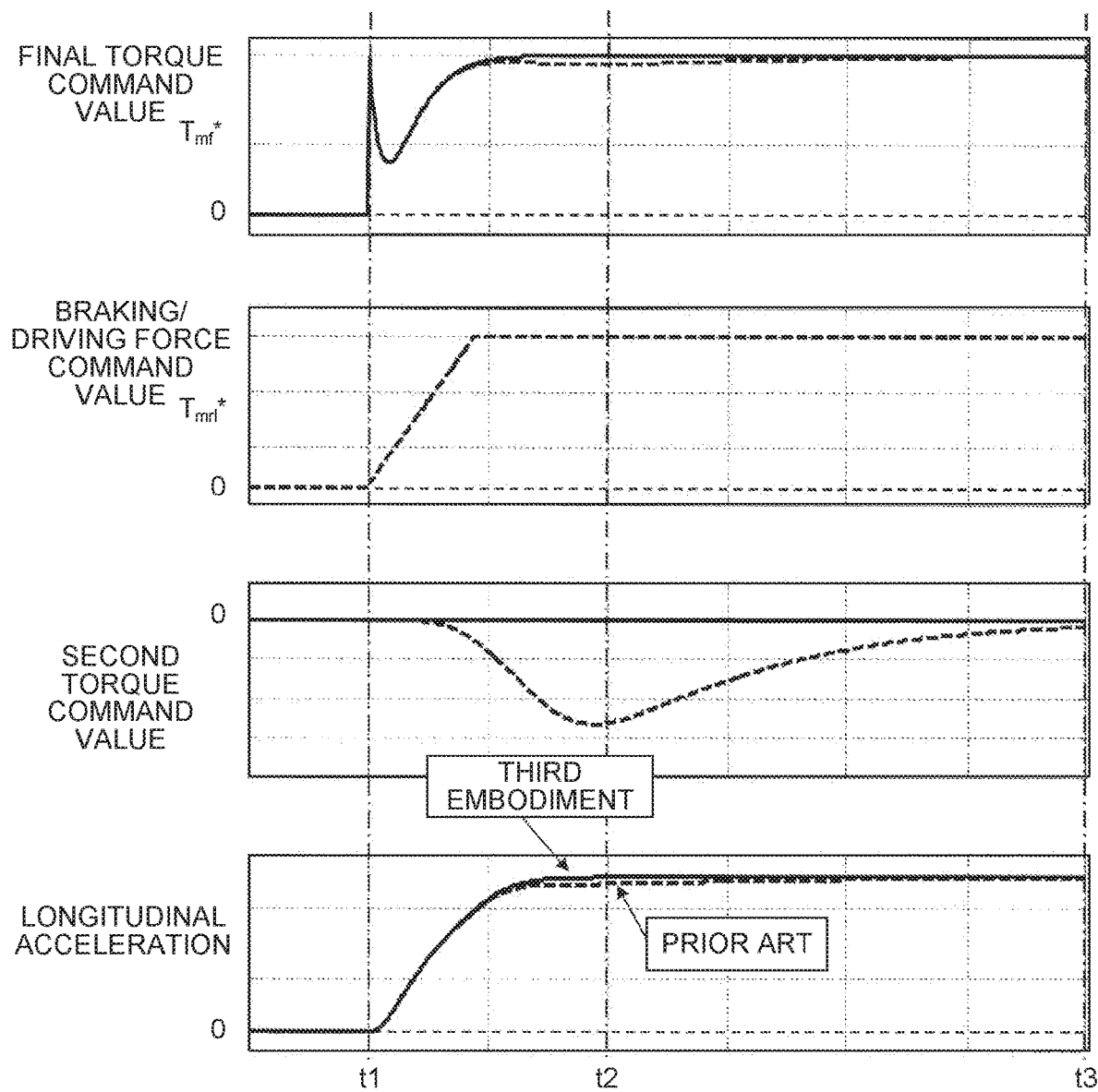
FIG. 19 is a time chart illustrating one example of the control results when a control device of one or more embodiments is applied to an electric vehicle, and the control results according to the prior art.

FIG. 19 is a time chart for comparison between the control results by the control device for an electric vehicle of one or more embodiments and the control results according to the prior art. In the figure, a final torque command value Tmf*, a braking/driving force command value Tmr1, a second torque command value, and a longitudinal acceleration of a vehicle are respectively illustrated in this order from above. In the figure, solid lines indicate the control results according to one or more embodiments, and broken lines indicate the control results according to the prior art. Note that since there is no difference between the prior art and one or more embodiments described here, the braking/driving force command value Tm1* is indicated by a broken line.

FIG. 19 illustrates the control results in a vehicle, being a 2WD electric motor vehicle, in which a braking/driving force (e.g. braking torque, engine output, or the like) is input also to drive wheels different from drive wheels to which an electric motor is connected. Specifically, FIG. 19 illustrates the control results when a driver rapidly depresses an accelerator from a stopped state of the vehicle so that the front target torque command value and the braking/driving force command value for the different drive wheels are increased to accelerate the vehicle.

First, at time t1, the front final torque command value is changed by a step by depression of the accelerator pedal by the driver.

Then, in the prior art (broken lines), since both front and rear braking/driving forces are not considered, a detected value of a front motor rotation speed becomes greater than estimated by a feedback control system corresponding to an addition of a driving force by the different drive wheels. Then, in order to compensate for a torque corresponding to a motor rotation speed detected greater than estimated, the torque command value is corrected to the negative torque side (in a direction to reduce the motor torque) to impede the acceleration from time t1 to t3 (see the second torque command value). Therefore, the front final torque command value Tmf* cannot be output as a torque command value required by the driver. As a result, it is seen that the longitudinal acceleration of the vehicle is limited around time t2 compared to that at time t3.

In this way, in the prior art, since excess vibration suppression compensation is output from a vibration damping control F/B compensator to impede the acceleration of the vehicle, it is not possible to obtain an acceleration or deceleration intended by the driver based on an accelerator operation or a brake operation by the driver, and therefore, a sense of incongruity is given to the driver.

By contrast, according to the control device for an electric vehicle of one or more embodiments (solid lines), even when the front final torque command value is changed by a step at time t1, the second torque command value is zero from time t1 to t3. Therefore, even with the control device for an electric vehicle of one or more embodiments, it can be suppressed that excess vibration suppression compensation (negative torque) is output from the vibration damping control F/B compensator as in the prior art (broken lines). Therefore, from time t1 to t3, the front final torque command value Tmf* can be output as a torque command value intended by the driver.

As a result, even when the braking/driving force is generated on the different drive wheels, it is possible to obtain an acceleration intended by the driver. This is the effect achieved by correcting the motor rotation angular velocity estimated value using the filter configured based on the transfer function of the motor rotation angular velocity for the drive wheels according to the braking/driving force command value for the different drive wheels.

While the control results on the driving side of the 2WD electric vehicle have been described, the control results during the regenerative operation are the same. That is, in the prior art, when the 2WD electric vehicle is decelerated, the second torque command value is corrected to the positive torque side by excess vibration suppression compensation so that the deceleration is impeded, and therefore, it is not possible to obtain a deceleration intended by the driver. By contrast, according to the control device for an electric vehicle of one or more embodiments, like the control on the driving side described above, since it is possible to suppress the output of excess vibration suppression compensation (positive torque) from the vibration damping control F/B compensator, it is possible to realize a deceleration intended by the driver.

As described above, according to the control device for an electric vehicle of one or more embodiments, in the feed-forward computation, a drive shaft torsional angular velocity is calculated from the motor torque command value by using a dead zone vehicle model (vehicle model 1602) having a dead zone in which torque of the first motor (front drive motor) is not transferred to drive shaft torque, and the first torque command value is calculated by feeding back the calculated drive shaft torsional angular velocity to the motor torque command value. Consequently, the motor torque is controlled to be approximately zero in the dead zone period and to increase at the timing when the gears mesh with each other. As a result, in the case where the gears are disengaged due to the influence of the gear backlash, it is possible suppress a shock when the gears mesh with each other again.

Further, according to the control device for an electric vehicle of one or more embodiments, a filter with the transfer function of the rotation angular velocity of the first motor (front drive motor) for the second drive wheel (rear drive wheel) is approximated by a filter in which a torsional vibration frequency of at least one of the first drive wheel (front drive wheel) and the second drive wheel is set to a cutoff frequency. Consequently, it is possible to reduce the software computation load of the electric motor controller 2.

Further, according to the control device for an electric vehicle of one or more embodiments, a filter with the transfer function of the rotation angular velocity of the first motor (front drive motor) for the second drive wheel (rear drive wheel) is approximated to form a gain component of a transfer characteristic of the rotation angular velocity of the first motor for the second drive wheel. Consequently, since the motor rotation angular velocity estimated value $\omega\hat{}m2$ can be calculated by gain adjustment without using the vehicle model, it is possible to reduce the software computation load of the electric motor controller 2.

Further, according to the control device for an electric vehicle of one or more embodiments, a filter with the transfer function of the rotation angular velocity of the first motor (front drive motor) for the second drive wheel (rear drive wheel) has, in a denominator, a damping coefficient due to a torsional vibration frequency, and when having a characteristic in which the damping coefficient becomes less than 1, the damping coefficient is set to a value equal to or greater than 1. Consequently, it is possible to suppress the oscillatory characteristic of the motor rotation angular velocity correction amount.

Further, according to the control device for an electric vehicle of one or more embodiments, a 4WD vehicle model that simulates a transfer characteristic from torque inputs to the first drive wheel and the second drive wheel to motor rotation angular velocities of the first motor and the second motor may be used as the vehicle model Gp(s). Using the vehicle model that considers not only the front drive wheel but also the rear drive wheel, the motor rotation angular velocity can be estimated more accurately.

A control device for an electric vehicle of one or more embodiments is supposed to be applied to the system configuration 2 described above. Hereinafter, the vibration damping control computation process that is performed at step S503 described above by the control device for an electric vehicle of one or more embodiments will be described with reference to FIGS. 20 and 21.

Figure 20:
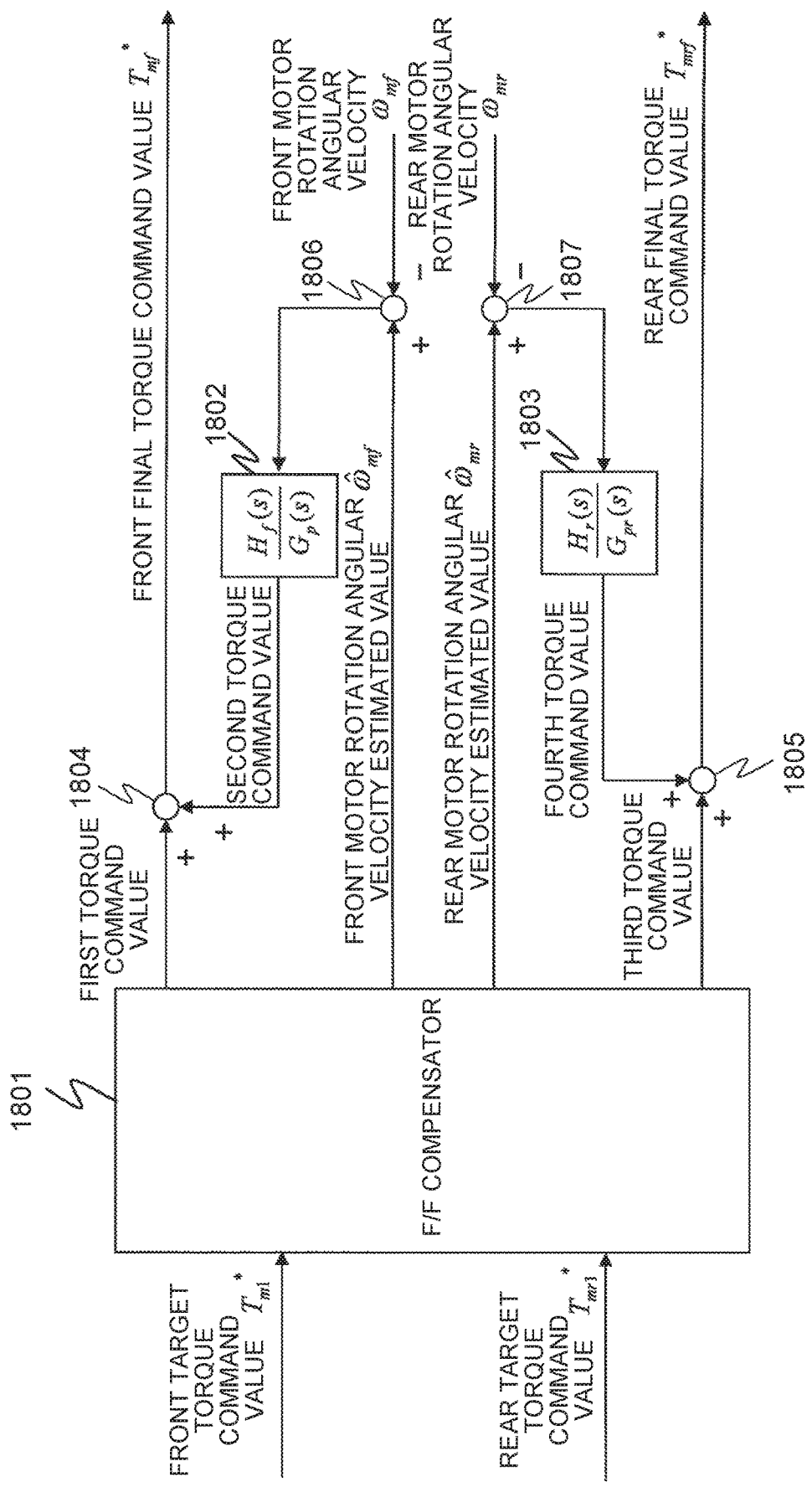
FIG. 20 is a block configuration diagram that realizes a vibration damping control computation process of one or more embodiments.

FIG. 20 is one example of a block configuration diagram that realizes the vibration damping control computation process of one or more embodiments. Control blocks illustrated in FIG. 20 include an F/F compensator 1801, a control block 1802, a control block 1803, adders 1804, 1805, and subtractors 1806, 1807.

The F/F compensator 1801 performs an F/F compensation process by using a front target torque command value Tm1* and a rear target torque command value Tmr1* as inputs and using a 4WD vehicle model. Consequently, the F/F compensator 1801 calculates a first torque command value and a second torque command value and further calculates a front motor rotation angular velocity estimated value ω^mf and a rear motor rotation angular velocity estimated value ω^mr. Details of the F/F compensator 1801 will be described with reference to FIG. 21.

Figure 21:
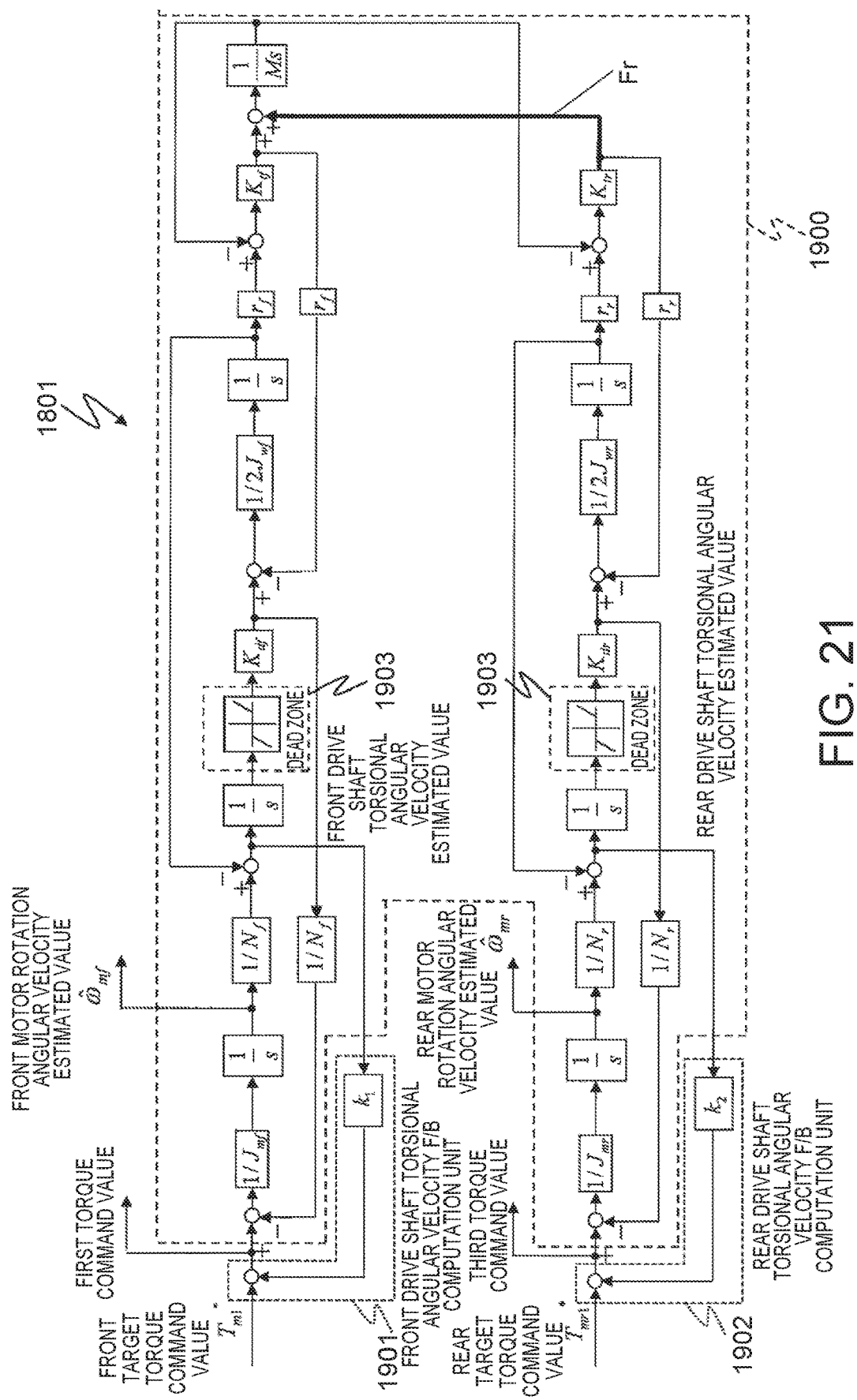
FIG. 21 is a block configuration diagram illustrating an F/F compensator of one or more embodiments.

FIG. 21 is one example of a control block configuration that realizes the F/F compensation process performed in the F/F compensator 1801.

As illustrated, the F/F compensator 1801 is composed of a 4WD vehicle model 1900, a front drive shaft torsional angular velocity F/B computation unit 1901, and a rear drive shaft torsional angular velocity F/B computation unit 1902.

The 4WD vehicle model 1900 is configured by adding a front dead zone model 1903 and a rear dead zone model 1904 to the 4WD vehicle model 903 illustrated in FIG. 10, which is configured equivalent to the equation of motion (1) to (11) of the 4WD vehicle.

The front dead zone model 1903 is a dead zone model that simulates the vehicle parameters (see FIG. 7) and a gear backlash characteristic from the front drive motor 2f to the front drive wheel 9f, and is given by the above formula (63).

The rear dead zone model 1904 is a dead zone model that simulates, like the front dead zone model, the vehicle parameters (see FIG. 7) and a gear backlash characteristic from the rear drive motor 2r to the front drive wheel 9r, and is given by the following formula (66) by applying the above formulas (37) to (53).

[Formula 66]

$$k_2 = 2(1-\zeta_{pr})\omega_{pr} K_{dr}/g_{tr} \qquad (66)$$

The 4WD vehicle model 1900 thus configured uses the first torque command value and the third torque command value as inputs and calculates a front drive shaft torsional angular velocity estimated value, a rear drive shaft torsional angular velocity estimated value, the front motor rotation angular velocity estimated value ω^mf, and the rear motor rotation angular velocity estimated value ω^mr.

Herein, in the illustrated 4WD vehicle model 1900, a driving force Fr for the rear drive wheels calculated based on the third torque command value is added to a system that calculates the front motor rotation angular velocity estimated value ω^mf based on the first torque command value. Consequently, in the 4WD vehicle model, the front motor rotation angular velocity estimated value calculated based on the first torque command value can be corrected based on the rear target torque command value indicating a braking/driving torque for the rear drive wheels.

The front drive shaft torsional angular velocity F/B computation unit 1901 first multiplies the input front drive shaft torsional angular velocity estimated value by a gain k1 which is used for matching a transfer characteristic from a front final torque command value to a front drive shaft torque and a model response to each other. Then, a value obtained by multiplying the front drive shaft torsional angular velocity estimated value by the gain k1 is subtracted from the front target torque command value Tm1*, thereby calculating the first torque command value. The gain k1 is given by the above formula (62).

The rear drive shaft torsional angular velocity F/B computation unit 1902 first multiplies the input rear drive shaft torsional angular velocity estimated value by a gain k2 which is used for matching a transfer characteristic from a rear final torque command value to a rear drive shaft torque and a model response to each other. Then, a value obtained by multiplying the rear drive shaft torsional angular velocity estimated value by the gain k2 is subtracted from the rear target torque command value Tmr1*, thereby calculating the third torque command value. The gain k2 is given by the following formula (67).

[Formula 67]

$$T_{dr} = \begin{cases} K_{dr}(\theta_{dr} - \theta_{deadr}/2) & (\theta_{dr} \geq \theta_{deadr}/2) \\ 0 & (-\theta_{deadr}/2 < \theta_{dr} < \theta_{deadr}/2) \\ K_d(\theta_d + \theta_{deadr}/2) & (\theta_{dr} \leq -\theta_{deadr}/2) \end{cases} \qquad (67)$$

Referring back to FIG. 20, the description will be continued. The adder 1806 subtracts a front motor rotation angular velocity ωmf from the front motor rotation angular velocity estimated value ω^mf to calculate a deviation between the estimated value and the detected value of the front motor rotation angular velocity and outputs the calculated value to the control block 1802.

The control block 1802 is composed of a band-pass filter Hf(s) given by the above formula (34) and an inverse characteristic of a vehicle model Gp(s) given by the above formula (19). The control block 1802 calculates a second torque command value by using as an input the deviation between the estimated value and the detected value of the front motor rotation angular velocity and multiplying the deviation by Hf(s)/Gp(s).

Then, the adder 1804 adds the first torque command value and the second torque command value to calculate a front final torque command value Tmf*.

Likewise, the adder 1807 subtracts a rear motor rotation angular velocity ωmr from the rear motor rotation angular velocity estimated value ω^mr to calculate a deviation between the estimated value and the detected value of the rear motor rotation angular velocity and outputs the calculated value to the control block 1803.

The control block 1802 is composed of a band-pass filter Hr(s) given by the above formula (35) and an inverse characteristic of the vehicle model Gp(s) given by the above formula (19). The control block 1803 calculates a fourth torque command value by using as an input the deviation between the estimated value and the detected value of the rear motor rotation angular velocity and multiplying the deviation by Hr(s)/Gp(s).

Then, the adder 1805 adds the third torque command value and the fourth torque command value to calculate a rear final torque command value Tmrf*.

Herein, in a vehicle having a plurality of drive wheels, when the drive shaft torsional vibration resonance frequencies of the front and rear drive wheels differ from each other, drive shaft torsional vibration is induced on one of the drive wheels due to the influence of torque disturbance of the other drive wheel. However, as described above, by using the vehicle model 1900 designed aiming at a plurality of drive wheels and the drive shaft torsional angular velocity F/B computation units 1901, 1902 respectively provided for the plurality of drive wheels, the drive shaft torsional vibration described above can be suppressed. Note that when there is no delay or disturbance of the control system, it is possible to suppress the drive shaft torsional vibration of the front and rear drive wheels only by the F/F compensator 1801.

By the rear final torque command value Tmrf* and the front final torque command value Tmf* calculated as described above, it is also possible to suppress the output of excess vibration suppression compensation from a vibration damping control F/B compensator as indicated by the control results illustrated in FIG. 9 described above (see one or more embodiments in the figure), and therefore, it is possible to obtain an acceleration intended by a driver even during the acceleration using the front and rear drive wheels.

As described above, according to the control device for an electric vehicle of one or more embodiments, when the electric vehicle includes a second motor (rear drive motor) as a power source for the second drive wheel (rear drive wheel), the vehicle model Gp(s) is a 4WD vehicle model that simulates a transfer characteristic from torque inputs to the first drive wheel and the second drive wheel to motor rotation angular velocities of the first motor (front drive motor) and the second motor, and the control device calculates a third torque command value by a feedforward computation based on the motor torque command value, detects a rotation angular velocity of the second motor, calculates a fourth torque command value from a deviation between a detected value and an estimated value of the rotation angular velocity of the second motor, and controls torque of the second motor according to a second final torque command value obtained by adding the third torque command value and the fourth torque command value together. In the feedforward computation, the control device divides the motor torque command value into a first target torque command value (front target torque command value) for the first drive wheel and a second target torque command value (rear target torque command value) for the second drive wheel, calculates a rotation angular velocity estimated value of the first motor, a rotation angular velocity estimated value of the second motor, a drive shaft torsional angular velocity estimated value of the first drive wheel, and a drive shaft torsional angular velocity estimated value of the second drive wheel by using the first target torque command value and the second target torque command value as inputs and using the 4WD vehicle model 1900, and corrects the rotation angular velocity estimated value of the first motor based on the second target torque command value. The control device calculates the first torque command value by subtracting from the first target torque command value a value obtained by multiplying the drive shaft torsional angular velocity estimated value of the first drive wheel by a predetermined gain, and calculates the third torque command value by subtracting from the second target torque command value a value obtained by multiplying the drive shaft torsional angular velocity estimated value of the second drive wheel by a predetermined gain.

Consequently, it is possible to suppress the output of excess vibration suppression compensation from the vibration damping control F/B compensator, and therefore, it is possible to obtain an acceleration intended by a driver even during the acceleration using the front and rear drive wheels, and further, it is possible to suppress drive shaft torsional vibration of the front and rear drive wheels.

While the control devices for electric vehicle of one or more embodiments have been described, one or more embodiments are not limited to the above-described embodiments, and various modifications and applications are possible. For example, although it has been described that the control device for an electric vehicle of one or more embodiments described above is supposed to be applied to the 4WD vehicle of the system configuration 2, it can also be applied to the vehicle of the system configuration 1. In that case, a rear target torque command value Tmr1* (see FIG. 6) is handled as a braking/driving force command value that is input to the F/B compensator 1502 (see FIG. 16) and the control block 1704 (see FIG. 18) of the system configuration 1. Consequently, even in the vehicle of the system configuration 1, the effect equivalent to that in the vehicle of the system configuration 2 can be obtained by calculating a correction motor rotation angular velocity estimated value from the braking/driving force command value as the rear target torque command value.

In the description of the above-described one or more embodiments, a drive wheel at the front of the vehicle is referred to as a front drive wheel (first drive wheel), and a drive wheel at the rear of the vehicle is referred to as a rear drive wheel (second drive wheel). However, the front and rear of the drive wheels do not necessarily coincide with the front and rear of the vehicle. A drive wheel at the rear of the vehicle may be referred to as a front drive wheel (first drive wheel), and a drive wheel at the front of the vehicle may be referred to as a rear drive wheel (second drive wheel).

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A control method for an electric vehicle, the control method configured to set a motor torque command value based on vehicle information and to control torque of a first motor connected to a first drive wheel, the first drive wheel being one of a front drive wheel and a rear drive wheel, the control method comprising:

calculating a first torque command value by a feedforward computation based on the motor torque command value;

detecting a rotation angular velocity of the first motor;

estimating a rotation angular velocity of the first motor based on the first torque command value by using a vehicle model Gp(s) that simulates a transfer characteristic from a torque input to the first drive wheel to a rotation angular velocity of the first motor;

calculating a second torque command value from a deviation between a detected value and an estimated value of the rotation angular velocity of the first motor by using a filter H(s)/Gp(s) composed of an inverse characteristic of the vehicle model Gp(s) and a band-pass filter H(s) with a center frequency close to a torsional vibration frequency of the vehicle;

controlling the torque of the first motor according to a first final torque command value obtained by adding the first torque command value and the second torque command value together; and correcting, when a braking/driving torque for a second drive wheel being the drive wheel other than the first drive wheel is input, the estimated value of the rotation angular velocity of the first motor based on the braking/driving torque.

2. The control method for an electric vehicle according to claim 1, wherein:
when the braking/driving torque for the second drive wheel being the drive wheel other than the first drive wheel is input, a motor rotation angular velocity correction amount is calculated by using a transfer function of the rotation angular velocity of the first motor for the second drive wheel, the transfer function modeled in advance and using the braking/driving torque as an input; and
the estimated value of the rotation angular velocity of the first motor is corrected based on the motor rotation angular velocity correction amount.

3. The control method for an electric vehicle according to claim 1,
wherein, when the electric vehicle includes a second motor as a power source for the second drive wheel, the vehicle model Gp(s) is a 4WD vehicle model that simulates a transfer characteristic from torque inputs to the first drive wheel and the second drive wheel to motor rotation angular velocities of the first motor and the second motor, and
wherein the control method further comprises:
calculating a third torque command value by a feedforward computation based on the motor torque command value;
detecting a rotation angular velocity of the second motor;
calculating a fourth torque command value from a deviation between a detected value and an estimated value of the rotation angular velocity of the second motor by using a filter H(s)/Gpr(s) composed of an inverse characteristic of a vehicle model Gpr(s) that simulates a transfer characteristic from a torque input to the second drive wheel to a motor rotation angular velocity of the second motor, and a band-pass filter H(s) with a center frequency close to a torsional vibration frequency of the vehicle;
controlling torque of the second motor according to a second final torque command value obtained by adding the third torque command value and the fourth torque command value together; and
calculating a rotation angular velocity estimated value of the first motor and a rotation angular velocity estimated value of the second motor by using the first torque command value and the third torque command value as inputs and using the 4WD vehicle model, and correcting the rotation angular velocity estimated value of the first motor based on the third torque command value.

4. The control method for an electric vehicle according to claim 1,
wherein, when the electric vehicle includes a second motor as a power source for the second drive wheel, the vehicle model Gp(s) is a 4WD vehicle model that simulates a transfer characteristic from torque inputs to the first drive wheel and the second drive wheel to motor rotation angular velocities of the first motor and the second motor,
wherein the control method further comprises:
calculating a third torque command value by a feedforward computation based on the motor torque command value;
detecting a rotation angular velocity of the second motor;
calculating a fourth torque command value from a deviation between a detected value and an estimated value of the rotation angular velocity of the second motor; and
controlling torque of the second motor according to a second final torque command value obtained by adding the third torque command value and the fourth torque command value together, and
wherein the feedforward computation comprises:
dividing the motor torque command value into a first target torque command value for the first drive wheel and a second target torque command value for the second drive wheel;
calculating a rotation angular velocity estimated value of the first motor, a rotation angular velocity estimated value of the second motor, a drive shaft torsional angular velocity estimated value of the first drive wheel, and a drive shaft torsional angular velocity estimated value of the second drive wheel by using the first target torque command value and the second target torque command value as inputs and using the 4WD vehicle model, and correcting the rotation angular velocity estimated value of the first motor based on the second target torque command value;
calculating the first torque command value by subtracting from the first target torque command value a value obtained by multiplying the drive shaft torsional angular velocity estimated value of the first drive wheel by a predetermined gain; and
calculating the third torque command value by subtracting from the second target torque command value a value obtained by multiplying the drive shaft torsional angular velocity estimated value of the second drive wheel by a predetermined gain.

5. The control method for an electric vehicle according to claim 3,
wherein, when a drive shaft torsional vibration frequency of the first drive wheel and a drive shaft torsional vibration frequency of the second drive wheel differ from each other, a model response used in the feedforward computation that calculates the first torque command value and a model response used in the feedforward computation that calculates the third torque command value are matched to each other.

6. The control method for an electric vehicle according to claim 5, wherein:
when the drive shaft torsional vibration frequency of the second drive wheel is smaller than the drive shaft torsional vibration frequency of the first drive wheel, the model response used in the feedforward computation that calculates the first torque command value is matched to the model response used in the feedforward computation that calculates the third torque command value; and
when the drive shaft torsional vibration frequency of the first drive wheel is smaller than the drive shaft torsional vibration frequency of the second drive wheel, the model response used in the feedforward computation that calculates the third torque command value is matched to the model response used in the feedforward computation that calculates the first torque command value.

7. The control method for an electric vehicle according to claim 5, further comprising:
- calculating the first torque command value by the feedforward computation using a filter having a transfer characteristic that damps the drive shaft torsional vibration frequency of the first drive wheel; and
- calculating the third torque command value by the feedforward computation using a filter having a transfer characteristic that damps the drive shaft torsional vibration frequency of the second drive wheel.

8. The control method for an electric vehicle according to claim 2, wherein a filter with the transfer function of the rotation angular velocity of the first motor for the second drive wheel is approximated by a filter in which a torsional vibration frequency of at least one of the first drive wheel and the second drive wheel is set to a cutoff frequency.

9. The control method for an electric vehicle according to claim 2, wherein a filter with the transfer function of the rotation angular velocity of the first motor for the second drive wheel is approximated to form a gain component of a transfer characteristic of the rotation angular velocity of the first motor for the second drive wheel.

10. The control method for an electric vehicle according to claim 2, wherein:
- a filter with the transfer function of the rotation angular velocity of the first motor for the second drive wheel has, in a denominator, a damping coefficient due to a torsional vibration frequency; and
- when having a characteristic in which the damping coefficient becomes less than 1, the damping coefficient is set to a value equal to or greater than 1.

11. The control method for an electric vehicle according to claim 2, wherein, in the feedforward computation, a drive shaft torsional angular velocity is calculated from the motor torque command value by using a dead zone vehicle model having a dead zone in which torque of the first motor is not transferred to drive shaft torque, and the first torque command value is calculated by feeding back the calculated drive shaft torsional angular velocity to the motor torque command value.

12. The control method for an electric vehicle according to claim 2, wherein the vehicle model $Gp(s)$ is a 4WD vehicle model that simulates a transfer characteristic from torque inputs to the first drive wheel and the second drive wheel to motor rotation angular velocities of the first motor and a second motor as a power source for the second drive wheel.

13. A control device for an electric vehicle, the control device comprising:
- a controller configured to set a motor torque command value based on vehicle information and to control torque of a first motor connected to a first drive wheel, the first drive wheel being one of a front drive wheel and a rear drive wheel, wherein the controller is configured to:
  - calculate a first torque command value by a feedforward computation based on the motor torque command value;
  - detect a rotation angular velocity of the first motor;
  - estimate a rotation angular velocity of the first motor based on the first torque command value by using a vehicle model $Gp(s)$ that simulates a transfer characteristic from a torque input to the first drive wheel to a rotation angular velocity of the first motor;
  - calculate a second torque command value from a deviation between a detected value and an estimated value of the rotation angular velocity of the first motor by using a filter $H(s)/Gp(s)$ composed of an inverse characteristic of the vehicle model $Gp(s)$ and a band-pass filter $H(s)$ with a center frequency close to a torsional vibration frequency of the vehicle;
  - control the torque of the first motor according to a first final torque command value obtained by adding the first torque command value and the second torque command value together; and
  - correct, when a braking/driving torque for a second drive wheel being the drive wheel other than the first drive wheel is input, the estimated value of the rotation angular velocity of the first motor based on the braking/driving torque.

* * * * *